United States Patent
Yamamoto et al.

(10) Patent No.: US 8,583,864 B2
(45) Date of Patent: *Nov. 12, 2013

(54) VIRTUAL VOLUME CONTROL METHOD INVOLVING DEVICE STOP

(75) Inventors: Yasutomo Yamamoto, Sagamihara (JP); Takashige Iwamura, Yokohama (JP); Yoshiaki Eguchi, Yokohama (JP)

(73) Assignee: Hitachi, Ltd., Tokyo (JP)

(*) Notice: Subject to any disclaimer, the term of this patent is extended or adjusted under 35 U.S.C. 154(b) by 257 days.

This patent is subject to a terminal disclaimer.

(21) Appl. No.: 13/028,568

(22) Filed: Feb. 16, 2011

(65) Prior Publication Data

US 2011/0145495 A1 Jun. 16, 2011

Related U.S. Application Data

(63) Continuation of application No. 12/700,039, filed on Feb. 4, 2010, now Pat. No. 7,908,433, which is a continuation of application No. 11/332,526, filed on Jan. 17, 2006, now Pat. No. 7,680,981.

(30) Foreign Application Priority Data

Nov. 14, 2005 (JP) ................................. 2005-328713

(51) Int. Cl.
  *G06F 12/00* (2006.01)
  *G06F 13/00* (2006.01)
  *G06F 13/28* (2006.01)
(52) U.S. Cl.
  USPC .................................. 711/112; 711/E12.001
(58) Field of Classification Search
  USPC .......................................... 711/112, E12.001
  See application file for complete search history.

(56) References Cited

U.S. PATENT DOCUMENTS 5,638,307 A * 6/1997 Kamimura et al. ........... 713/321
6,535,967 B1   3/2003 Milillo et al.
(Continued)

FOREIGN PATENT DOCUMENTS

JP   2003-015915   1/2003
JP   2005-011277   1/2005
(Continued)

OTHER PUBLICATIONS

U.S. Appl. No. 11/138,473, filed May 27, 2005.
(Continued)

*Primary Examiner* — Sheng-Jen Tsai
(74) *Attorney, Agent, or Firm* — Antonelli, Terry, Stout & Kraus, LLP.

(57) ABSTRACT

Provided is a storage system capable of starting/stopping a disk drive. At the time of allocating a logical device, it is judged, based on attributes including a purpose of the logical device, whether or not control can be performed in terms of start/stop of an allocation target disk drive to determine an allocation destination disk drive. Further, in the case where access to a specific logical device is stopped due to release of a path definition or other such cause, it is judged whether or not a disk drive corresponding to the logical device can be stopped. When it is judged that the disk drive can be stopped, the disk drive is stopped. When it is judged that the disk drive cannot be stopped, the logical device is migrated to another disk drive that can be stopped, a migration destination disk drive is stopped.

10 Claims, 18 Drawing Sheets

(56) References Cited

U.S. PATENT DOCUMENTS

| | | |
|---|---|---|
| 7,680,981 B2 * | 3/2010 | Yamamoto et al. ............ 711/112 |
| 7,908,433 B2 * | 3/2011 | Yamamoto et al. ............ 711/112 |
| 2002/0184463 A1 | 12/2002 | Arakawa et al. |
| 2003/0088638 A1 | 5/2003 | Gluck et al. |
| 2003/0204597 A1 * | 10/2003 | Arakawa et al. ............... 709/226 |
| 2004/0044862 A1 | 3/2004 | Carlson et al. |
| 2004/0257857 A1 | 12/2004 | Yamamoto et al. |
| 2005/0097243 A1 | 5/2005 | Yamashita et al. |
| 2005/0111249 A1 | 5/2005 | Yagisawa et al. |
| 2005/0120173 A1 | 6/2005 | Minowa |
| 2005/0144384 A1 | 6/2005 | Eguchi et al. |
| 2005/0144414 A1 | 6/2005 | Yamamoto et al. |
| 2005/0160221 A1 | 7/2005 | Yamazaki et al. |
| 2005/0210137 A1 | 9/2005 | Taguchi |
| 2006/0224850 A1 | 10/2006 | Yamamoto et al. |
| 2007/0113005 A1 * | 5/2007 | Yamamoto et al. ............ 711/112 |
| 2009/0006735 A1 * | 1/2009 | Kumagai et al. ............... 711/112 |
| 2010/0138601 A1 * | 6/2010 | Yamamoto et al. ............ 711/112 |
| 2011/0145495 A1 * | 6/2011 | Yamamoto et al. ............ 711/112 |

FOREIGN PATENT DOCUMENTS

| | | |
|---|---|---|
| JP | 2005-209149 | 4/2005 |
| JP | 2005-157710 | 6/2005 |
| JP | 2006-285464 | 10/2006 |
| JP | 2007-018483 | 1/2007 |

OTHER PUBLICATIONS

European Search Report; Annex to European Search Report; CF Form 1507 (5 pgs), published Jan. 19, 2007.

* cited by examiner

LOGICAL DEVICE MANAGEMENT INFORMATION 201

CONFIGURATION INFORMATION ON LOGICAL DEVICE #0

| Field | ID |
|---|---|
| LOGICAL DEVICE NUMBER | 301 |
| SIZE | 302 |
| CORRESPONDING DOWNSTREAM DEVICE NUMBER | 303 |
| TYPE | 304 |
| DEVICE STATE | 305 |
| PORT NUMBER/TARGET ID/LUN LIST | 306 |
| NAME OF CONNECTED HOST | 307 |
| MIGRATING DOWNSTREAM DEVICE NUMBER | 308 |
| DATA MIGRATION PROGRESS POINTER | 309 |
| MIGRATING DATA FLAG | 310 |
| STOP FLAG | 311 |
| LAST START/STOP TIME | 312 |

VIRTUAL VOLUME CONTROL METHOD INVOLVING DEVICE STOP

CROSS-REFERENCE TO RELATED APPLICATIONS

This application is a continuation of U.S. application Ser. No. 12/700,039, filed Feb. 4, 2010 now U.S Pat. No. 7,908,433, which, in turn, is a continuation of U.S. application Ser. No. 11/332,526, filed Jan. 17, 2006 (now U.S. Pat. No. 7,680,981), and which application claims priority from Japanese patent application P2005-328713 filed on Nov. 14, 2005, the contents of which are hereby incorporated by reference into this application.

BACKGROUND

This invention relates to a method of controlling a storage system shared by a plurality of computers in a computer system, in particular, a method of allocating a storage device to a computer and starting or stopping the storage device.

Data amount processed by a computer system is remarkably increasing by leaps and bounds while information systems are rapidly advancing owing to deregulation of electronic storage, expansion of Internet businesses, electronification of procedures, etc. In addition to such a dramatic increase in data amount, there have been increasing customers' demands for backup of data stored in a disk device to another disk device (Disk-to-Disk Backup), long-term retention of corporate records of business operations (including transaction information and electronic mail data) for audits, etc. As a result, the data stored in storage systems continues to increase by leaps and bounds, causing the storage systems to become larger in scale. This is followed by attempts to boost the storage systems of corporate information systems on a department/system basis, while it is demanded that management of IT infrastructures, which are becoming more complicate, be more simplified and more efficient. In particular, it is more greatly expected that the management of a storage system be more simplified and the total cost be optimized by utilizing optimal storage systems according to values of data thereof.

JP 2005-011277 A discloses a technique of virtualizing a storage system, as one of methods for reducing management cost of a large-scale storage system. According to the virtualization technique disclosed in JP 2005-011277 A, a first storage system is connected to one or more second storage systems. A device to be provided to an upstream apparatus (for example, a host) by the second storage system (hereinafter, the device will be referred to as "logical device") is herein provided to the host via the first storage system as a logical device of the first storage system. Hereinafter, such a technique of virtualizing a storage system will be referred to as an external storage system connection method. Upon reception of a request for an input/output with respect to the logical device from a host, the first storage system judges which of a logical device of the second storage system and a physical device such as a disk drive within the first storage system the access target device corresponds to. According to the results, the first storage system transmits an input/output request to a proper access destination.

Further, JP 2003-015915 A discloses a technique of managing a volume whose capacity can be extended dynamically, as one of methods for simplifying design of a storage system. Hereinafter, the volume whose capacity can be extended dynamically will be referred to as an extension volume. According to JP 2003-015915 A, when a logical device is defined, a physical storage area (of a hard disk drive (HDD) or the like) having a device capacity requested by a user is not allocated statistically. On the other hand, a pool area corresponding to a physical storage area is provided within the storage system. When update access is made to the logical device, a physical storage area having a necessary capacity is dynamically added from the pool area only to the portion to be updated. As a result, a large-capacity logical device can be introduced even for the small-capacity physical storage area, which can simplify the storage capacity designing.

Furthermore, JP 2005-157710 A discloses a technique of controlling start/stop of a disk drive, as one of methods for reducing management cost of a large-scale storage system used for long-term retention of mass data. According to JP 2005-157710 A, it is possible to reduce maintenance/management cost (power consumption and apparatus exchange cost) of a storage system by stopping disk rotation of a disk drive (HDD or the like), which corresponds to a logical device designated by a host or backup software, or cutting power supply to the disk drive.

SUMMARY

By using a storage system that implements the external storage system connection method disclosed in JP 2005-011277 A, it is possible to build a storage system by integrating a plurality of storage systems different in attributes including performances, reliabilities, and prices. For example, a high-cost, high-performance, and high-reliability first storage system including external storage system connection means can be connected to a plurality of low-cost, low-performance, and low-reliability second storage systems to implement a hierarchical storage system in which data can be optimally arranged according to the freshness or a value of data. For the purpose of preparation for audits, such a hierarchical storage system is used to store mass information, which includes transaction information and electronic mail data generating from everyday operations, for a long term at optimal cost depending on the value of each information piece.

Further, by combining the above-mentioned external storage system connection system with the extension volume technique shown in JP 2003-015915 A and the disk drive start/stop control technique shown in JP 2005-157710 A, it is possible to simplify the storage system designing and reduce the storage system maintenance/running cost.

However, in a case of a storage system in which a storage system to which a disk drive start/stop control technique is applied and a storage system without the application coexist, it is essential to perform storage area management in consideration of characteristics of the respective storage systems. In other words, it is well expected that access is rarely made to a volume storing data such as volume for archive data that needs to be retained for a long term, so that such data is desirably stored in a storage system to which the disk drive start/stop control technique is applied based on how rare the access is made and a data amount size. Meanwhile, a volume constantly used in an operation system, such as a database volume, is demanded to be in constant use regardless of the data retention term.

On the other hand, when update access is made, a logical device to which the extension volume technique is applied is allocated with a preset amount of physical storage area from a pool area. At this time, to improve access performance, data is distributed in arrangement to a plurality of disk array groups. In a case of applying a disk drive start/stop control technique to such a logical device to which the extension volume technique is applied, control needs to be made in terms of start and stop of a disk drive corresponding to the logical device, in other words, a disk drive corresponding to a pool area storing a physical storage area. However, the pool area stores physical storage areas of the plurality of logical devices, so that the start and stop of a disk drive cannot be controlled solely for a specific logical device. If all logical devices stored in a pool area should come to a disk drive stop state simultaneously, all the logical devices corresponding to the pool area would have to be started when the disk drive is next started to use even a single specific logical device. Accordingly, the disk drive start/stop control technique cannot be used effectively for the logical device to which the extension volume technique is applied.

It is therefore an object of this invention to allow allocation of a logical device to a storage area satisfying conditions in a storage system in which a storage system to which a disk drive start/stop control technique is applied and a storage system without the application coexist, or uses the external storage system connection method.

It is another object of this invention to apply a disk drive start/stop control technique to a logical device, to which an extension volume technique is applied, in the storage system, and to allow long-term retention/management of a large-capacity logical device with a small physical capacity and low running cost (power consumption).

According to an exemplary embodiment of this invention, there is provided a computer system, including: at least one of host computers; a storage system connected to at least one of the host computers via a first network; and a management server connected to at least one of the host computers and the storage system via a second network. The host computer includes: a first port connected to the first network; a first interface connected to the second network; a first processor connected to the first port and the first interface; and a first memory connected to the first processor. The storage system includes: a second port connected to the first network; a second interface connected to the second network; a second processor connected to the second port and the second interface; a second memory connected to the second processor; one or more first physical devices that each include one or more disk drives that each including a disk controlled in terms of start and stop of rotation thereof and store data written by the host computer; and a plurality of logical devices set in the storage system. At least one of the logical devices corresponds to a pool area. The management server including: a third interface connected to the second network; a third processor connected to the third interface; and a third memory connected to the third processor. The computer system being characterized in that: the third processor receives a path release request with respect to the logical device; the third processor refers to information included in the received path release request to judge whether or not it is necessary to stop the logical device; the third processor transmits a path release request including a request to stop the logical device to the storage system through the third interface when it is judged that it is necessary to stop the logical device; the second processor receives the path release request including the request to stop the logical device through the second interface; the second processor releases a path definition of the logical device designated by the received path release request; the second processor judges whether or not the logical device designated by the received path release request corresponds to the pool area; the second processor specifies a physical device corresponding to the logical device designated by the received path release request when it is judged that the logical device designated by the received path release request does not correspond to the pool area; the second processor judges whether or not the specified physical device is the first physical device; and the second processor stops disk drives composing the first physical device when the specified physical device is the first physical device.

According to an embodiment of this invention, in a case where mass data is retained in many disk drives for a long term in a storage system in which a storage system to which a disk drive start/stop control technique is applied and a storage system without the application coexist, logical device definition instructions made by a user or an application program are used to select a storage system complying with configurational requirements derived from information on a purpose of the logical device etc., and define the logical device. As a result, by applying disk drive start/stop control even to such a storage system, it is possible to suppress power consumption and increase the life of an apparatus, allowing the reduction of system running cost.

Further, according to another embodiment of this invention, in response to a detachment instruction for a logical device made by a user or an application, a disk drive corresponding to the logical device is stopped to suppress power consumption thereof, allowing the reduction of system running cost.

BRIEF DESCRIPTION OF THE DRAWINGS

The present invention can be appreciated by the description which follows in conjunction with the following figures, wherein:

FIG. 3 is an explanatory diagram showing an example of logical device management information according to the embodiment of this invention;

DETAILED DESCRIPTION OF THE PREFERRED EMBODIMENTS

Hereinafter, a best mode for carrying out this invention will be described with reference to the accompanying drawings.

First, outline of an embodiment of this invention will be explained.

According to this embodiment, in a storage system including a first storage system having an external storage connection method connected to one or more second storage systems, when a definition request for a first logical device in the first storage system is issued from a user or an application, a configuration requirement is determined based on the definition request for the logical device, a physical device or a second logical device of the second storage system which meets the configuration requirement is selected, and the first logical device is allocated to the selected device, thereby defining an LU path.

Further, according to the embodiment of this invention, in the storage system, when a detach request for the first logical device in the first storage system is issued from the user or the application, the LU path definition of the first logical device is released, and whether the first logical device needs to be stopped is determined based on control information added to the request. When the stop is necessary, the physical device or the second logical device in the second storage system corresponding to the first logical device is stopped. At this time, when the physical device or the second logical device in the second storage system is a device on which stop processing cannot be performed, another physical device or a third logical device in the second storage system on which the stop processing can be performed is selected, and the first logical device is migrated to the selected device. Thus, the device corresponding to the first logical device can be stopped.

Figure 1:
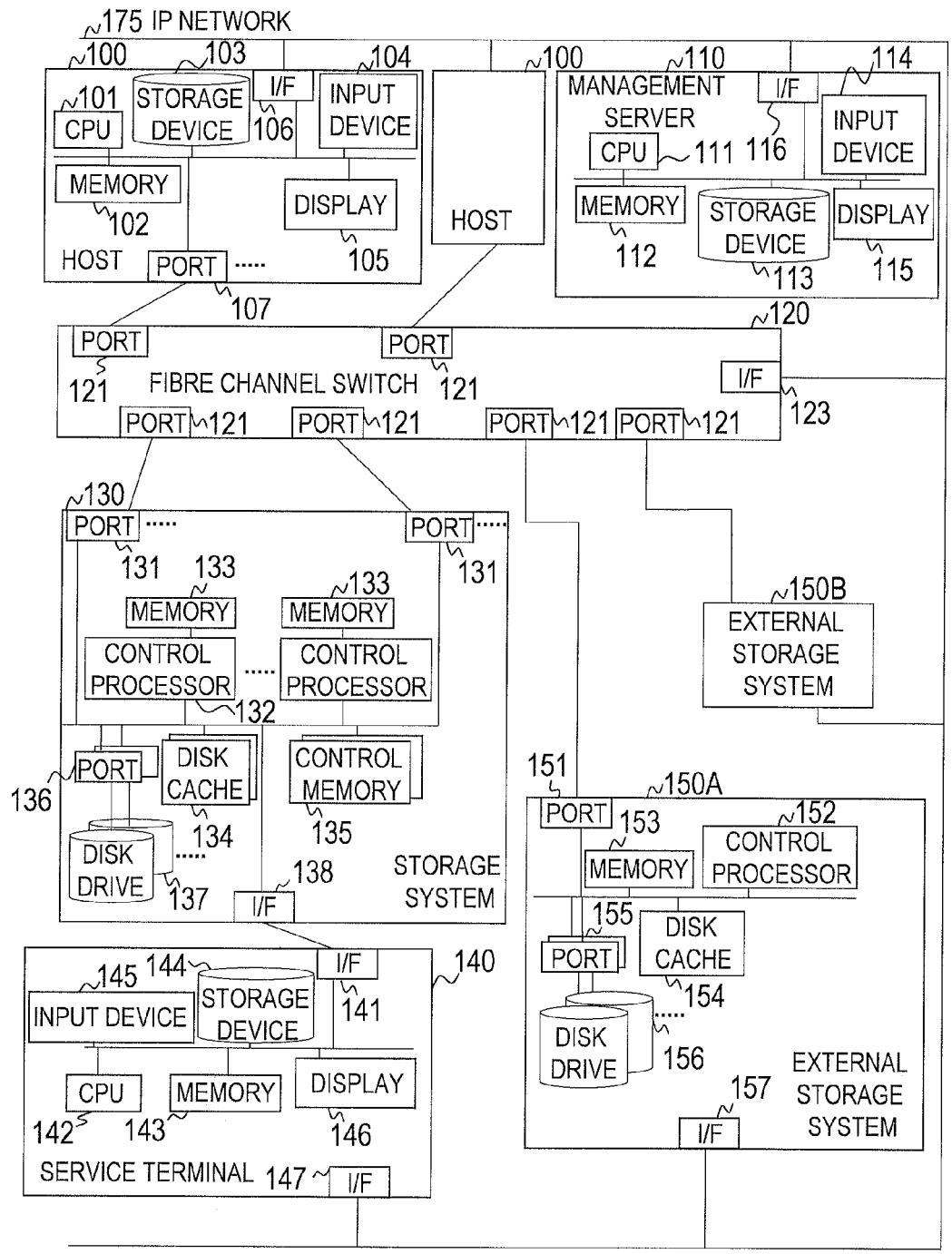
FIG. 1 is a block diagram showing an example of a hardware configuration of a computer system according to an embodiment of this invention.

FIG. 1 is a block diagram showing an example of a hardware configuration of a computer system according to the embodiment of this invention.

The computer system of this embodiment includes one or more host computers (hereinafter, also referred to as host) 100, a management server 110, a Fibre Channel switch 120, a storage system 130, a service terminal 140, and external storage systems 150A and 150B. The external storage systems 150A and 150B are collectively referred to as external storage system 150 when no particular distinction is required.

The host 100, the storage system 130, and the external storage system 150 are connected to ports 121 of the Fibre Channel switch 120 via ports 107, 131, and 151, respectively. The host 100, the storage system 130, the external storage system 150, and the Fibre Channel switch 120 are connected to the management server 110 via an IP network 175 from interface controller (I/F) 106, 138, 157, and 123, respectively, and integrally managed by storage management software (not shown) operating on the management server 110.

The interface controller 138 of the storage system 130 of this embodiment is connected to the management server 110 via the service terminal 140. However, the interface controller 138 may be directly connected to the IP network 175.

The host 100 is a computer including a CPU 101, a memory 102, a storage device 103, an input device 104, a display 105, an interface control unit 106, and a port 107.

The CPU 101 is a processor for reading out and executing software stored in the memory 102. The CPU 101 executes software such as an operation system and an application program to achieve the predetermined functions.

The memory 102 stores software such as an operation system and an application program read from the storage device 103.

The storage device 103 is, for example, a disk drive or an optical-magnetic disk drive for storing software such as an operation system and an application program.

The input device 104 is, for example, a keyboard or a mouse. The input device 104 receives input from a host administrator, etc.

The display 105 is a display for outputting information as instructed from the CPU 101.

The interface control unit 106 is connected to the IP network 175. The host 100 may include a plurality of interface control units 106.

The port 107 is connected to the port 121 of the Fibre Channel switch 120. The host 100 includes one or more host bus adapters (HBA), and one HBA may include one or more ports 107.

The management server 110 is a computer including a CPU 111, a memory 112, a storage device 113, an input device 114, a display 115, and an interface control unit 116.

The CPU 111 is a processor for reading out and executing software stored in the memory 112. The CPU 111 executes storage management software, etc. to achieve the predetermined functions such as entire computer system operation and maintenance management.

The memory 112 stores storage management software, etc. read from storage device 113.

The storage device 113 is, for example, a disk drive or an optical-magnetic disk drive for storing storage management software, etc.

The input device 114, the display 115, and the interface control unit 116 are similar to the input device 104, the display 105, and the interface control unit 106, so descriptions thereof are omitted.

When the storage management software is executed by the CPU 111, the management server 110 collects configuration information, a resource usage rate, performance monitoring information, an error log, etc. of each device in the computer system, from interface control unit 116 via the IP network 175. Then, the management server 110 outputs the collected information to a display such as the display 115 to present the information to the storage administrator. Also, the management server 110 receives instructions from the storage administrator via the input device 114 such as the keyboard and the mouse, and transmits the received operation/maintenance instructions to each device via the interface control unit 116.

The storage system 130 is a data storage device including one or more ports 131, one or more control processors 132, one or more memories 133 respectively connected to the control processors 132, one or more disk caches 134, one or more control memories 135, one or more ports 136, one or more disk drives 137 respectively connected to the ports 136, and an interface control unit 138. Those devices are connected via an internal connecting network.

The control processor 132 specifies an access target device for input/output requests received from the port 131, and processes the input/output requests to the device in the disk drive 137 or the external storage system 150 corresponding to device. At this time, the control processor 132 specifies the access target device based on port ID and LUN (Logical Unit Number) contained in the received input/output requests. In this embodiment, as the port 131, a port corresponding to the Fibre Channel interface with an SCSI (Small Computer System Interface) as an upper-layer protocol is assumed. However, the port 131 may a port corresponding to another storage system connection network interface such as an IP network interface with the SCSI as the upper-layer protocol.

Data written by the host 100 is eventually stored in the disk drive 137 or 156.

The storage system 130 of this embodiment has the following device hierarchy. First, a disk array is formed by a plurality of disk drives 137. This disk array is managed by the control processor 132 as one physical device (also referred to as PDEV in the drawings, etc.). Further, the control processor 132 of this invention directly allocates a logical device (also referred to as LDEV in the drawings, etc.) to a physical device mounted in the storage system 130 (in other words, the control processor 132 makes the physical device correspond to the logical device). The logical device is managed in the storage system 130, and its number is individually managed for each storage system 130. Each logical device corresponds to LUN assigned to each port 131, and provided to the host 100 as the device of the storage system 130. In other words, the host 100 recognizes the logical device of the storage system 130. The host 100 uses the LUN of the port 131 corresponding to the logical device to access the data stored in the storage system 130.

In this embodiment, the control processor 132 can execute external storage connection. The external storage connection is a technology with which the logical device of the external storage system 150 is managed as an external device (also referred to as EDEV in the drawings, etc.) and virtualized as a device of the storage system 130. With this external storage connection, one or more external devices managed by the storage system 130 directly correspond to the logical device of the storage system 130 similarly to the physical device. The external device is also individually managed in each storage system 130.

Also, in this embodiment, an extension volume technology may be applied to the logical device. The extension volume technology is a virtual volume management technology with which a physical storage area is additionally allocated dynamically to a logical device having an update access. In that case, a pool volume (also referred to as pool VOL in the drawings, etc.) is allocated to the physical device or the external device. Further, an extension volume (also referred to as extension VOL in the drawings, etc.) corresponding to the pool volume is defined. Then, a logical device is allocated to the extension volume.

Here, the extension volume is a virtual device using the extension volume technology, and corresponds one-to-one to the logical device. The pool volume is a virtual device for managing the physical storage area dynamically allocated to the extension volume. In this embodiment, for simplicity, one pool volume corresponds to one physical device or one external device. However, one pool volume may correspond to a plurality of physical devices or external devices.

For example, when the storage system 130 receives the update access request from the host 100, when no physical storage area is allocated to an area on extension VOL corresponding to an area on the target logical device of the request, the storage system 130 allocates a physical storage area of the pool VOL that has not been allocated yet to another extension VOL, to the area of the request target. Then, the storage system 130 stores the request target data in the logical device. As a result, the request target data is stored in the physical storage area allocated to the extension VOL corresponding to the area on the logical device of the request target.

To realize the above device hierarchy, the control processor 132 manages each device, in other words, the logical device, the extension volume, the pool volume, the physical device, the disk drive 137, and correspondence among the logical devices of the external device and the external storage system 150. Further, the control processor 132 executes processing for converting an access request to the logical device into access request to the disk drive 137 or the logical device of the external storage system 150 and transmitting it to an appropriate device.

As described above, the storage system 130 of this embodiment collectively defines a plurality of disk drives 137 as one or a plurality of physical devices (in other words, the plurality of disk drives 137 correspond collectively to one or a plurality of physical devices), and allocates one logical device or one pool volume to one physical device to provide it to the host 100. However, of course, each disk drive 137 may correspond to one physical device, and one logical device or one pool volume may be allocated to the physical device.

Also, other than the input/output processing to the device, the control processor 132 executes various processings for realizing data coordination between devices such as data copy and data rearrangement.

Also, the control processor 132 transmits configuration information to be presented to the storage administrator, to the service terminal 140 connected via the interface control unit 138. Then, maintenance/operation instructions input from the storage administrator to the service terminal 140 are received by the service terminal 140 to execute configuration change, etc. of the storage system 130.

The disk cache 134 may previously store data frequently read from the disk drive 137 to increase the processing speed for the access request from the host 100 or temporarily store write data received from the host 100. For example, after write data received from host 100 is stored in the disk cache 134 and before the write data is actually written in the disk drive 137, the control processor 132 may reply to the write request to the host 100. Such processing is called write-after. When write-after using the disk cache 134 is executed, write data stored in the disk cache should be protected against a deletion before written to the disk drive 137. Therefore, it is desired to increase availability of the disk cache 134. Therefore, for example, the disk cache 134 may be made nonvolatile using battery backup, etc. or the disk cache 134 may be duplexed to increase resistance to medium failure.

The control memory 135 stores control information for managing attributes of each device for realizing the device hierarchy and correspondence between the devices, control information for managing clean or dirty data for the disk device stored on the disk cache 134, and the like. If the control information stored in the control memory 135 is lost, data stored in the disk drive 137 cannot be accessed. Therefore, the control memory 135 desirably has high availability similarly to the disk cache 134.

As shown in FIG. 1, the devices in the storage system 130 are connected to each other via the internal connecting network and transmission/reception of data, control information, and configuration information is executed between the devices. Through the internal connecting network, each of the control processors 132 can share and manage configuration information of the storage system 130. For increasing the availability, the internal connecting network is also desirably duplexed.

The service terminal 140 includes a CPU 142, a memory 143, a storage device 144, an interface control unit 141, an interface control unit 147, an input device 145, and a display 146.

The CPU 142 reads a storage management program stored in the storage device 144 to the memory 143 and executes the program to execute configuration information reference, configuration change instruction, operation instruction for a particular function, etc. As a result, the service terminal 140 becomes an interface relating to maintenance operation of the storage system 130 between the storage administrator or the management server 110 and the storage system 130. The storage system 130 may be directly connected to the management server 110 and managed by operating management software at the management server 110. In this case, the service terminal 140 can be omitted from the computer system.

The memory 143 and the storage device 144 are similar to the memory 112 and the storage device 113 of the management server 110 except that the memory 143 and the storage device 144 each store the memory 143 and the storage device 144 the storage management program.

The input device 145 receives inputs from the storage administrator.

The display 146 is a display for outputting configuration information, management information, etc. of the storage system 130 to the storage administrator.

The interface control unit 141 is connected to the storage system 130.

The interface control unit 147 is connected to the IP network 175.

The external storage system 150 is a data storage device including one or more ports 151, a control processor 152, a memory 153, a disk cache 154, one or more disk drives 156, and one or more ports 155.

The one or more ports 151 are connected to the port 131 of the storage system 130 via the Fibre Channel switch 120.

The control processor 152 executes a program stored in the memory 153 to process input/output requests received from the port 151 to the disk drive 156.

The disk cache 154 is similar to the disk cache 135 of the storage system 130.

The one or more ports 155 are respectively connected to the one or more disk drives 156.

The external storage system 150 of this embodiment has no control memory and is of a storage system whose configuration is smaller than the storage system 130. However, the external storage system 150 may be a similar storage system having the same configuration on the same scale as that of the storage system 130.

The Fibre Channel switch 120 has the plurality of ports 121 and composes a network (so-called storage area network) having the host 100, the storage system 130, and the external storage system 150 mutually connected.

In this embodiment, as shown in FIG. 1, the port 131 of the storage system 130 is connected to the port 151 of the external storage system 150 via the Fibre Channel switch 120. Therefore, it is desirable to suppress direct access from the host 100 to the external storage system 150 by setting zoning of the Fibre Channel switch 120. Alternatively, the port 131 may be directly connected to the port 151 without through the Fibre Channel switch 120.

Next, a software configuration of the storage system 130 in the embodiment of this invention will be described.

Figure 2:
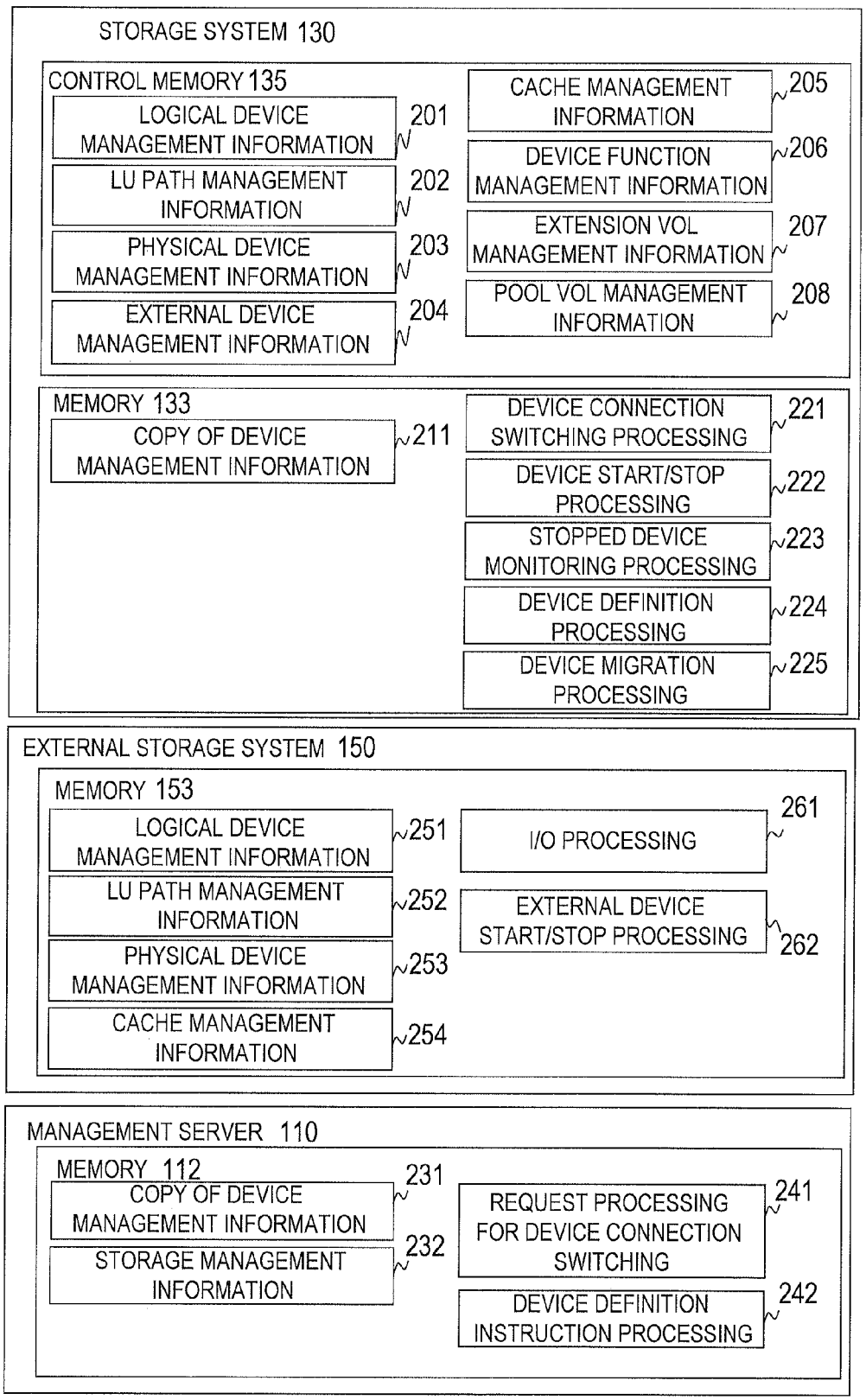
FIG. 2 is a block diagram showing an example of a software configuration of a storage system according to the embodiment of this invention.

FIG. 2 is a software configuration diagram showing examples of control information and programs for storage control processing stored in a control memory and memories of the storage system 130, the external storage system 150, and the management server 110 according to the embodiment of this invention.

A control memory 135 of the storage system 130 stores, as configuration management information of the storage system 130, logical device management information 201, LU path management information 202, physical device management information 203, external device management information 204, cache management information 205, device function management information 206, extension VOL management information 207, and pool VOL management information 208. In this embodiment, all information is stored in the control memory 135 for protecting information against losses. The control processor 132 can refer to and update the control information. However, at this time, access via an interconnection network is required. Thus, for improving processing performance, copy of control information necessary for processing executed by each control processor 132 (copy of device management information 211) is stored in the memory 133. Further, configuration information of the storage system 130 is transmitted to be stored also in a control terminal 140 and the management server 110.

When the configuration of the storage system 130 is changed according to an instruction of the storage management software or the storage administrator received from the management server 110 or the service terminal 140, or when the configuration in the storage system 130 is changed due to failure of each device, automatic exchange, or the like, one of the control processors 132 updates the corresponding configuration information in the control memory 135. Then, the control processor 132 notifies other control processors 132, the service terminal 140, and the management server 110 via interconnection network that the control information is updated because of configuration change, and latest information is fetched from the control memory 135 to memories of other device.

The memory 133 of the storage system 130 stores in addition to the copy of device management information 211, device connection switching processing 221, device start/stop processing 222, stopped device monitoring processing 223, device definition instruction processing 224 and device migration processing 225. Those processings are programs executed by the control processor 132. Those processings will be described in detail later.

Similarly to the storage system 130, the memory 153 of the external storage system 150 stores logical device management information 251, LU path management information 252, physical device management information 253, and cache management information 254, for device management and data management of the logical device and the physical device in the device. The plurality of pieces of information are respectively used for the same purposes as those of the logical device management information 201, the LU path management information 202, the physical device management information 203, and the cache management information 205, which are stored in the storage system 130.

Further, the memory 153 of the external storage system 150 stores I/O processing 261 and external device start/stop processing 262. Those processings are programs executed by the control processor 152. Those processings will be described in detail later.

The memory 112 of the management server 110 stores copy of device management information 231 and storage management information 232 indicating an attribute of each storage system collected from the storage system 130 and external storage system 150. The information may be stored in the storage device 113 mounted in the management server 110 for avoiding data loss.

Further, the memory 112 of the management server 110 stores request processing for device connection switching 241 and device definition instruction processing 242. Those processings are programs executed by the CPU 111. Those processings will be described in detail later.

Next, each management information will be described. First, the logical device management information 201 will be described.

FIG. 3 is an explanatory diagram showing an example of the logical device management information 201 according to the embodiment of this invention.

The logical device management information 201 holds an information set from a logical device number 301 to a last start/stop time 312 for each logical device.

The logical device number 301 stores a number allocated to a logical device by the control processor 132 to identify logical devices.

The size 302 stores a capacity of the logical device specified by the logical device number 301. Hereinafter, in the description of FIG. 3, the logical device specified by the logical device number 301 is mentioned as "the logical device".

A corresponding downstream device number 303 stores the number of the physical device, the external device, or the extension volume, which are corresponding to the logical device. The number of the physical device, the external device, or the extension volume is an entry number of the physical device management information 203, the external device management information 204, or the extension VOL management information 207, which is management information for each device.

The logical device of this embodiment corresponds one-to-one to the physical device, the external device, or the extension VOL. However, the logical device may correspond to the plurality of physical devices or a join of an external device. In this case, the logical device management information 201 needs a number list of the physical devices or the external devices corresponding to the respective logical devices and an entry storing the number of the physical devices or the external devices. When the logical device is undefined, the corresponding downstream device number 303 stores an invalid value.

A type 304 stores device type identification information of the logical device. The storage system 130 can define logical devices of a plurality of device types different in data management unit for the cache or storage format of device management information (as to whether a disk device space can store the management information, the storage format, etc.). The information stored in the type 304 indicates device types of each logical device.

A device state 305 stores information indicating a state of the logical device. The state of the logical device is one of "attached", "detached", "unimplemented" and "blocked".

"Attached" indicates a state where the logical device operates normally, a LU path is defined for one or more ports 131, and the host 100 can access the logical device. "Detached" indicates a state where the logical device is defined and operates normally, but the host 100 cannot access the logical device because the LU path is undefined, etc. "Unimplemented" indicates a state where the logical device is undefined for the physical device, the external device, or the extension VOL, and the host 100 cannot access the logical device. "Blocked" indicates a state where the logical device has a failure, and the host 100 cannot access the logical device.

An initial value of the device state 305 is "unimplemented", and changed to "detached" by the logical device definition processing, and further to "attached" by the LU path definition processing.

An entry 306 stores a port number, a target ID, and a LUN. The port number of the entry 306 is information indicating that LUN definition of the logical device is performed for which port of the ports 131, in other words, identification information of the port 131 used for the access to the logical device. Here, the identification information of the port 131 is a unique number assigned to each port 131 in the storage system 130. The target ID and the LUN stored in the entry 306 are identifiers for identifying logical devices. In this embodiment, used as identifiers for identifying logical devices are an SCSI-ID and an LUN used when the host 100 accesses the device on the SCSI. The entry 306 is set when executing LU path definition for the logical device.

A name of connected host 307 is a host name for identifying the host 100 which is allowed accessing the logical device. Any value may be used as the host name as long as it can uniquely identify the port 107 or the host 100, such as a WWN (World Wide Name) given to the port 107 of the host 100. In addition, the storage system 130 management holds information on a port attribute such as a WWN of each port 131. The entry 307 is set by the storage administrator during the logical device definition.

A migrating downstream device number 308, a migration progress pointer 309, and a migrating data flag 310 store information on data migration of the logical device.

The migrating downstream device number 308 stores a device number of migration destination when data of the physical device, external device, or extension VOL currently corresponding to the logical device is migrating to another physical device, external device, or extension VOL. During data migration of the logical device, the migrating data flag 310 stores "ON", the data migration progress pointer 309 stores address information indicating an end of an area where the data migration completes. The entries 308 and 309 are valid only when the migrating data flag 310 is "ON".

Information indicating start or stop of the logical device is set in the stop flag 311. In other words, when there is a detach request involving stop or a stop request from the user or the application program to the logical device and the storage system 130 receives the request, the stop flag 311 stores "Off" indicating stop of the logical device. Here, a detach request is a request for releasing the LU path definition about the logical device. When a detach request is issued for the logical device in the "attached" state, its logical device state is changed to "detached". Also, when the logical device starts, the stop flag 311 stores "On" indicating start of the logical device.

A last start/stop time 312 stores information indicating a last time when the logical device starts or stops.

Next, the LU path management information 202 will be described.

Figure 4:
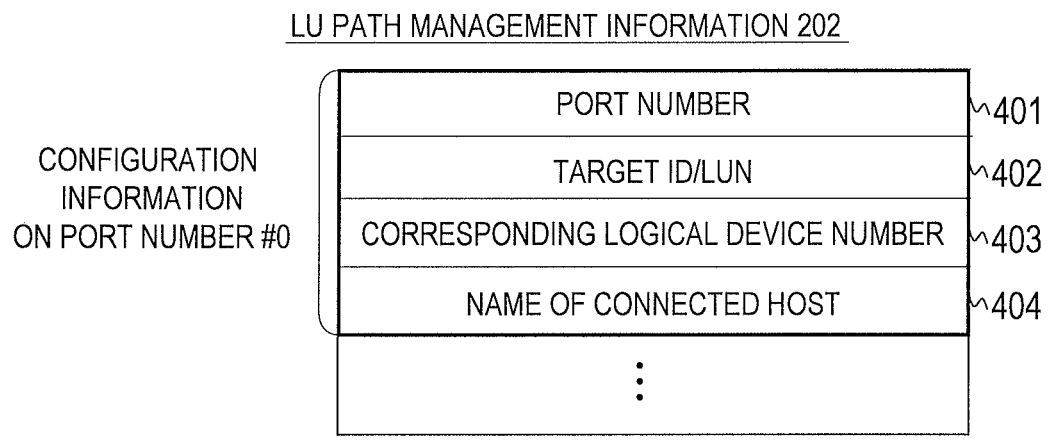
FIG. 4 is an explanatory diagram showing an example of LU path management information according to the embodiment of this invention.

FIG. 4 is an explanatory diagram showing an example of the LU path management information 202 according to embodiment of this invention.

For each port 131 in the storage system 130, the LU path management information 202 stores information on a valid LUN defined for each port.

A port number 401 stores an assigned number for identifying the port 131.

A target ID/LUN 402 stores a LUN defined (assigned) for the port 131 specified by the port number 401. Hereinafter, in the description of FIG. 4, the port 131 specified by the port number 401 is mentioned as "the port 131" and LUN defined for the port 131 is mentioned as "the LUN".

A corresponding logical device number 403 stores the number of the logical device to which the LUN is assigned.

A name of connected host 404 stores information indicating the host 100 which is allowed accessing the LUN defined for the port 131. As the information indicated by the host 100, for example, a WWN given to the port 107 of the host 100 is used. For one logical device, a plurality of the LUNs of the port 131 are defined (assigned) for one logical device, and the logical device may be accessed via the plurality of ports 131. In such case, the sum set of the names of connected host 404 of the LU path management information 202 on each LUN of the plurality of ports 131 is stored in a name of connected host 308 of the logical device management information 201 about the logical device.

Next, the physical device management information 203 will be described. The physical device management information 203 is used for managing a physical device including one or more disk drives 137 in the storage system 130.

Figure 5:
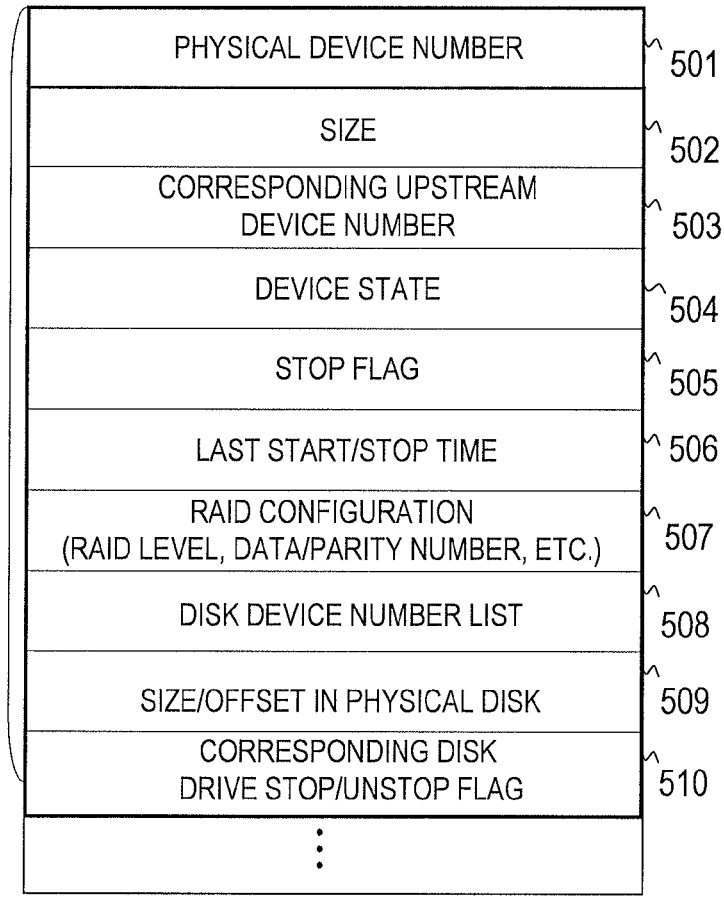
FIG. 5 is an explanatory diagram showing an example of physical device management information according to the embodiment of this invention.

FIG. 5 is an explanatory diagram showing an example of the physical device management information 203 according to embodiment of this invention.

Each storage system 130 holds an information set from a physical device number 501 to a corresponding disk drive stop/unstop flag 510 for each physical device in the storage system 130.

The physical device number 501 stores an identification number for identifying the physical device.

A size 502 stores a capacity of the physical device specified by the physical device number 501. Hereinafter, in the description of FIG. 5, the physical device specified by the physical device number 501 is mentioned as "the physical device".

A corresponding upstream device number 503 stores a logical device number or a pool VOL number corresponding to the physical device when the logical device or the pool VOL is defined. When the physical device is not allocated to the logical device or the pool VOL, the entry 503 stores an invalid value.

A device state 504 stores information indicating a state of the physical device. The physical device state is one of "attached", "detached", "unimplemented", and "blocked".

"Attached" indicates a state where the physical device operates normally and is allocated to the logical device or the pool VOL. "Detached" indicates that the physical device is defined and operates normally, but is not allocated to the logical device or the pool VOL. "Unimplemented" indicates a state where the physical device corresponding to the physical device number is undefined on the disk drive 137. "Blocked" indicates a state where the physical device has a failure and cannot be accessed.

An initial value of the device state 504 is "unimplemented", and changed to "detached" by the physical device definition processing, and further to "attached" when the logical device is defined.

A stop flag 505 stores information indicating a start or stop state of the physical device. In other words, when there is a detach request involving stop or a stop request from the user or the application program to the logical device corresponding to the physical device, the logical device stops after the request is accepted, all logical devices corresponding to the physical device stop and the disk drive 137 corresponding to the physical device stops, the stop flag 505 stores "Off" indicating stop of the physical device. On the other hand, when the physical device starts, the stop flag 505 stores "On" indicating start thereof.

A last start/stop time 506 stores information indicating a date and time when the physical device changes into the start or stop state, in other words, a date and time when the stop flag 505 is changed to "On" or "Off". By using the last start/stop time 506 and a current time, an elapsed time from the start or stop of the physical device to the present can be calculated.

A RAID configuration 507 stores information relating a RAID configuration. The information relating the RAID configuration is, for example, a RAID level of the disk drive 137 to which the physical device is allocated, the number of data disk devices and parity disk devices, and a size of a stripe that is a data division unit.

A disk device number list 508 holds identification numbers of the plurality of disk drives 137 structuring the RAID to which the physical device is allocated. Those identification numbers of the disk drive 137 are unique values given for identifying the disk drive 137 in the storage system 130.

A size/offset in physical disk 509 is information indicating which area in each disk drive 137 the physical device is allocated to. In this embodiment, for simplicity, a case will be described where an offset and a size in the disk drive 137 structuring the RAID are the same in all physical devices. However, this invention is applicable when the offset and the size differ in the physical devices.

The corresponding disk drive stop/unstop flag 510 stores "On" when start/stop control for one or more disk drives structuring the physical device is possible (in other words, a case where disk rotation start and stop of those disk drives is controlled). On the other hand, the corresponding disk drive stop/unstop flag 510 stores "Off" when start/stop control for one or more disk drives structuring the physical device is impossible (in other words, a case where disk rotation start and stop of those disk drives cannot be controlled). This flag is used for control/uncontrol judgment (for example, see step 1206 of FIG. 12).

Start and stop of the disk drive may be start and stop of the disk rotation in the disk drive, or application and interruption of power supplied to the disk drive.

Next, the external device management information 204 will be described. The external device management information 204 is used for managing the logical device, as the external device, of the external storage system 150 connected to the storage system 130.

Figure 6:
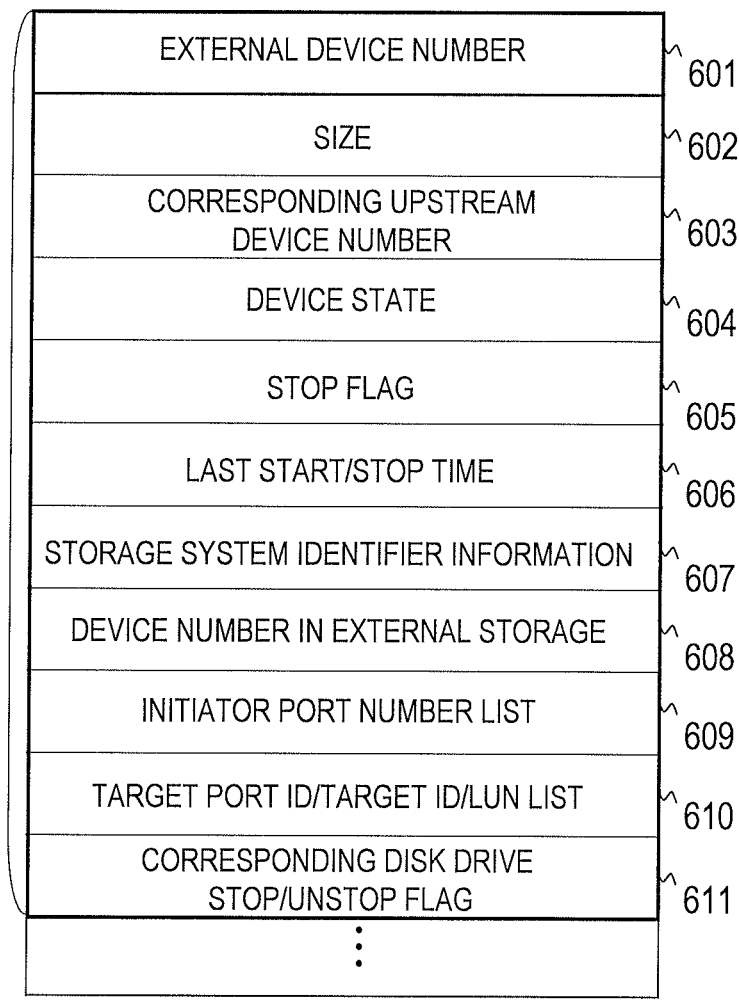
FIG. 6 is an explanatory diagram showing an example of external device management information according to the embodiment of this invention.

FIG. 6 is an explanatory view of the external device management information 204 according to the embodiment of this invention.

The storage system 130 holds information set from an external device number 601 to an corresponding disk drive stop/unstop flag 611 for each external device managed by the storage system 130.

The external device number 601 stores a unique value in the storage system 130 allocated to the external device by the control processor 132 of the storage system 130.

A size 602 stores a capacity of the external device specified by the external device number 601. Hereinafter, in the description of FIG. 6, the external device specified by the external device number 601 is mentioned as "the external device".

A corresponding upstream device number 603 stores the number of the logical device or the pool VOL corresponding to the external device in the storage system 130.

A device state 604, a stop flag 605, and a last start/stop time 606 store information on the external device similar to the device state 504, the stop flag 505, and the last start/stop time 506 of the physical device management information 203. In an initial state, the storage system 130 is not connected to the external storage system 150, so an initial value of the device state 604 is "unimplemented".

A storage system identifier 607 stores identification information on the external storage system 150 mounting the external device. The identification information of the external storage system 150 may be, for example, a combination of vendor identification information on the external storage system 150 and a manufacture serial number uniquely assigned by each vendor.

A device number in external storage 608 stores a logical device number of the logical device of the external storage system 150 corresponding to the external device, in other words, an identification number allocated to the logical device in the external storage system 150.

An initiator port number list 609 stores an identification number of the port 131 of the storage system 130 capable of accessing the external device. When access the external device from the plurality of ports 131 is possible, a plurality of port identification numbers are stored.

When the external device is subjected to LUN definition for one or more ports 151 of the external storage system 150, a target port ID/target ID/LUN list 610 stores port IDs of the ports 151 and one or more target IDs and LUNs to which the external devices are allocated. When the control processor 132 of the storage system 130 accesses the external device (in other words, when the control processor 132 transmits input/output requests from the port 131 to the external device), the target IDs and LUNs assigned to the external device by the external storage system 150 to which the external device belongs are used as information for identifying the external device.

A corresponding disk drive stop/unstop flag 611 stores information indicating whether disk drive start/stop control on the logical device of the external storage system 150 corresponding to the external device is possible. Specifically, it is judged whether the external storage system 150 itself corresponding to the external device disk drive 156 can control the start/stop. Further, when the external storage system 150 can control the start/stop of the disk drive 156, it is judged whether the disk drive 156 can control the start/stop corresponding to the logical device of the external storage system 150 dealt with the external device. As a result, when the control is possible, the corresponding disk drive stop/unstop flag 611 stores "On". On the other hand, when the control is impossible, the corresponding disk drive stop/unstop flag 611 stores "Off". This flag is used for the control/uncontrol judgment (for example, see step 1206 of FIG. 12).

Next, device function management information 206 will be described. The device function management information 206 stores attribute information (not shown) indicating various attributes set in each logical device. The attribute information of the logical device includes, for example, access control information for limiting access to the logical device only from a particular host, access attribute information for prohibiting read or write access to the logical device, information indicating whether or not to apply encryption to data in the logical device, and encryption setting information including key information used for encryption/decryption.

Next, the extension VOL management information 207 will be described. The extension VOL of this embodiment is a virtual volume to which the physical storage area is dynamically allocated. Specifically, when the extension VOL is defined, the physical storage area is not yet allocated to the extension VOL. After that, in response to update access from the host 100 or the like, as the physical storage area corresponding to an access target part on the extension VOL, the storage area of the pool VOL is dynamically allocated. The extension VOL management information 207 is used for management of correspondence between the extension VOL and the logical device and between the extension VOL and the pool VOL.

Figure 7:
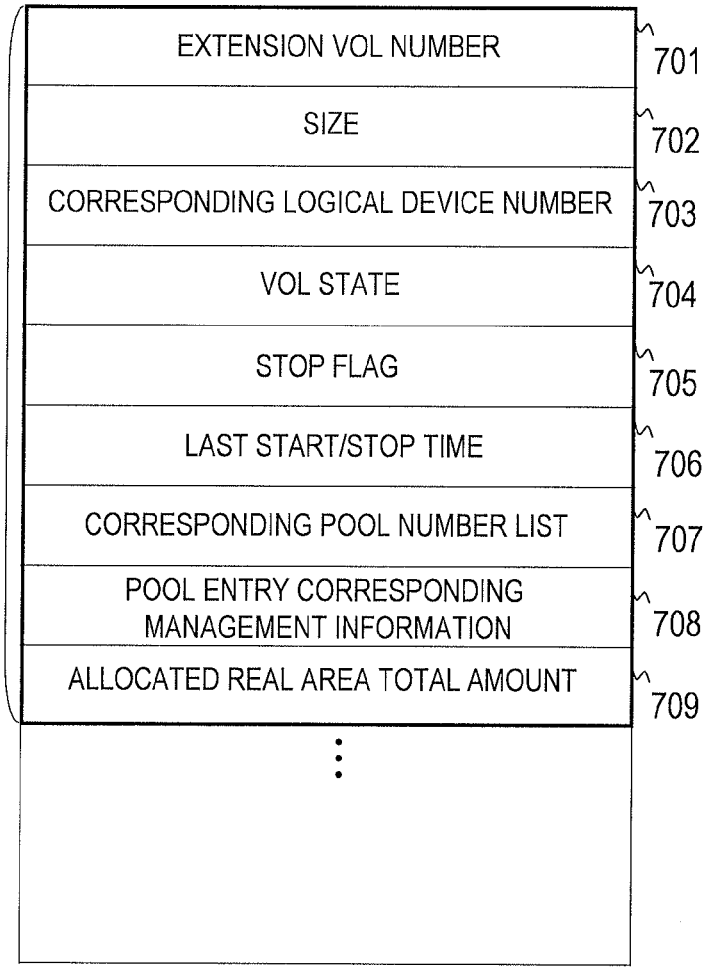
FIG. 7 is an explanatory diagram showing an example of extension VOL management information according to the embodiment of this invention.

FIG. 7 is an explanatory view of extension VOL management information 207 according to the embodiment of this invention.

The storage system 130 holds information set from the extension VOL number 701 to an allocated real area total amount 709 for each extension VOL.

The extension VOL number 701 stores a unique value in the storage system 130 assigned by the control processor 132 of the storage system 130 to the extension VOL.

A size 702 stores an apparent volume from the host 100 of the extension VOL specified by the extension VOL number 701. In other words, host 100 recognizes the capacity of the extension VOL as a value stored by the size 702. Hereinafter, in the description of FIG. 7, the extension VOL defined by the extension VOL number 701 is mentioned as "the extension VOL".

A corresponding logical device number 703 stores the number of the logical device corresponding to the extension VOL in the storage system 130.

A VOL state 704, a stop flag 705, and a last start/stop time 706 store information on the extension VOL similar to the device state 504, the stop flag 505, and the last start/stop time 506 of the physical device management information 203. In this embodiment, an initial value of the VOL state 704 is "unimplemented".

A corresponding pool number list 707 stores numbers of all pool VOL for storing the physical storage area of the extension VOL.

A pool entry corresponding management information 708 stores a storage area provided to the host by the extension VOL and information on correspondence with the physical storage area in the pool VOL corresponding to the extension VOL. In an initial state where the extension VOL has just been specified, no physical storage area is allocated to the extension VOL. Therefore, all storage areas of the extension VOL are unallocated. In response to update access to the logical device corresponding to the extension VOL from the host 100, etc., an access target position in the extension VOL is calculated to check whether the storage area of the pool VOL (in other words, physical storage area) is allocated to the corresponding storage area. When the physical storage area is not allocated to the access target storage area, an appropriate storage area is selected among one or more pool VOLs shown in the corresponding pool number list 707. Then, the selected storage area is allocated as the physical storage area corresponding to the access target storage area of the extension VOL.

The allocated real area total amount 709 stores a total capacity of the physical storage area allocated to the extension VOL.

Next, pool VOL management information 208 will be described. The pool VOL of this embodiment is a virtual volume for providing and managing the storage area allocated as the physical storage area of the extension VOL. The pool VOL management information 208 is used for management of correspondence between the pool VOL and the extension VOL and between the pool VOL and the physical device or the external device.

Figure 8:
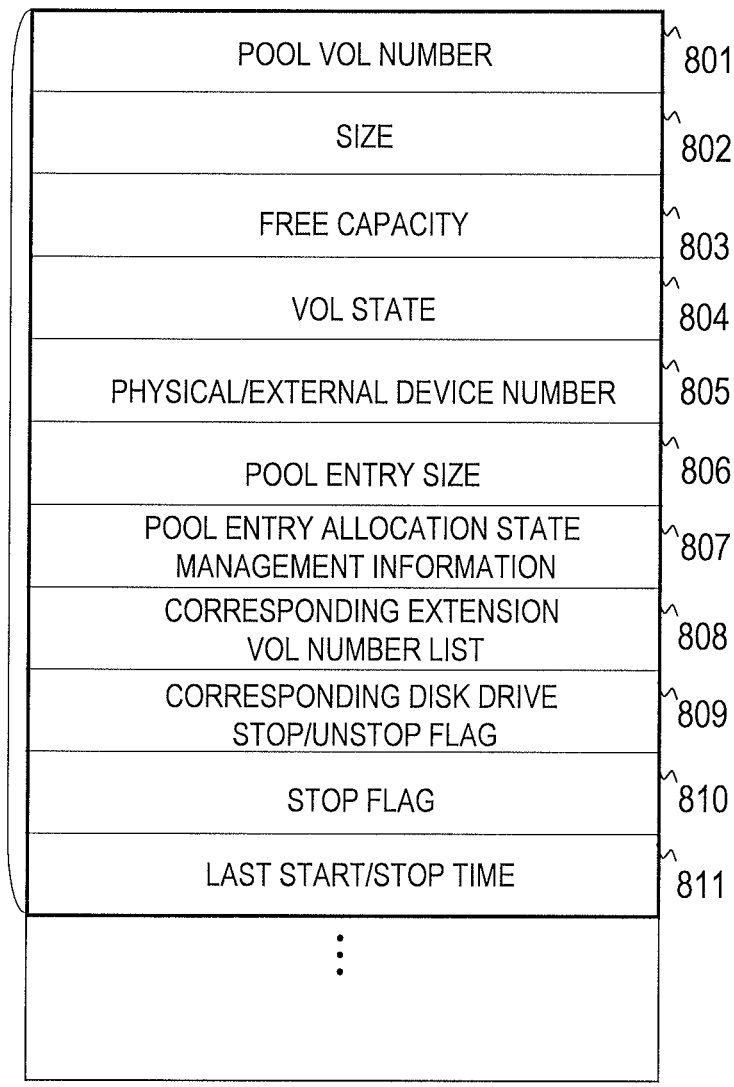
FIG. 8 is an explanatory diagram showing an example of pool VOL management information according to the embodiment of this invention.

FIG. 8 is an explanatory view of the pool VOL management information 208 according to the embodiment of this invention.

The storage system 130 holds information set from a pool VOL number 801 to a last start/stop time 811 for each pool VOL.

The pool VOL number 801 stores a unique value in the storage system 130 allocated to the pool VOL by the control processor 132 of the storage system 130.

A size 802 stores a capacity of the pool VOL specified by the pool VOL number 801. Hereinafter, in the description of FIG. 8, the pool VOL specified by the pool VOL number 801 is mentioned as "the pool VOL".

A free area 803 stores information on a total capacity of the storage area not allocated to the extension VOL.

A VOL state 804, a stop flag 810, and a last start/stop time 811 store information on the pool VOL similar to the VOL state 704, the stop flag 705, and the last start/stop time 706 of the extension VOL management information 207.

A physical/external device number 805 stores the number of the physical device or the external device to which the pool VOL is allocated.

A pool entry size 806 stores information the allocating unit (entry) for allocating the storage area of the pool VOL as the physical storage area of the extension VOL. The storage area of the extension VOL is divided into a plurality of entries having a size shown in the pool entry size 806 of the corresponding pool VOL.

Pool entry allocating state management information 807 stores correspondence between each entry of the extension VOL and each entry of the pool VOL.

A corresponding extension VOL number list 808 stores the number of one or more extension VOLs where the storage area of the pool VOL is allocated as the physical storage area.

A corresponding disk drive stop/unstop flag 809 stores the content of the corresponding disk drive stop/unstop flag 510 or 611 of the physical device or the external device corresponding to the pool VOL as it is copied.

In this embodiment, the storage system 130 uses the seven pieces of the device management information and the volume management information to manage the device and volume. At factory shipping, in each disk drive 137 of the storage system 130, a physical device is defined, but a logical device, an external device, an extension VOL, and a pool VOL are undefined. This is the initial state of the storage system 130.

In defining the physical device, depending on whether start/stop control for the disk drive 137 corresponding to each physical device is possible, "On" or "Off" is set in the corresponding disk drive stop/unstop flag 510 of the physical device management information 203. The physical device with the corresponding disk drive stop/unstop flag 510 set as "On" may stop the corresponding disk drive 137 when the device state is "detached", in other words, when the physical device is unallocated to the logical device. Thus, power consumption for operating the storage system 130 can be reduced.

Also, when installing the storage system 130, the user or the storage administrator defines the logical device of the external storage system 150 connected to the storage system 130 as the external device, and the logical device or the pool VOL can be defined on the physical device and the external device. When the pool VOL is defined, the user or the storage administrator further defines the extension VOL and the logical device. Then, the user or the storage administrator defines the LUN to each port 131 for the defined logical device.

Similarly to the physical device, among the external devices on which disk drive start/stop control can be performed, the disk drives 156 corresponding to drives not allocated to the logical device may stop. Further, when any external device corresponding to the external storage system 150 not allocated to the logical device, the external storage system 150 itself may stop.

Next, referring again to FIG. 2, programs relating to this invention stored in the memories 133, 153, and 112 of the storage system 130, the external storage system 150, and the management server 110 will be described.

Hereinafter, processing for defining the logical device to the storage system 130, attachment/detachment processing involving the start/stop of the logical device, and processing for periodically monitoring the stopped device will be described. Those processings are executed through coordination of the management server 110, the storage system 130, and the external storage system 150 for requests from the user or the application.

First, the processing for defining the logical device will be described. To define the logical device to the storage system 130, the management server 110 and the storage system 130 respectively execute device definition instruction processing 242 and the device definition instruction processing 224.

Figure 9:
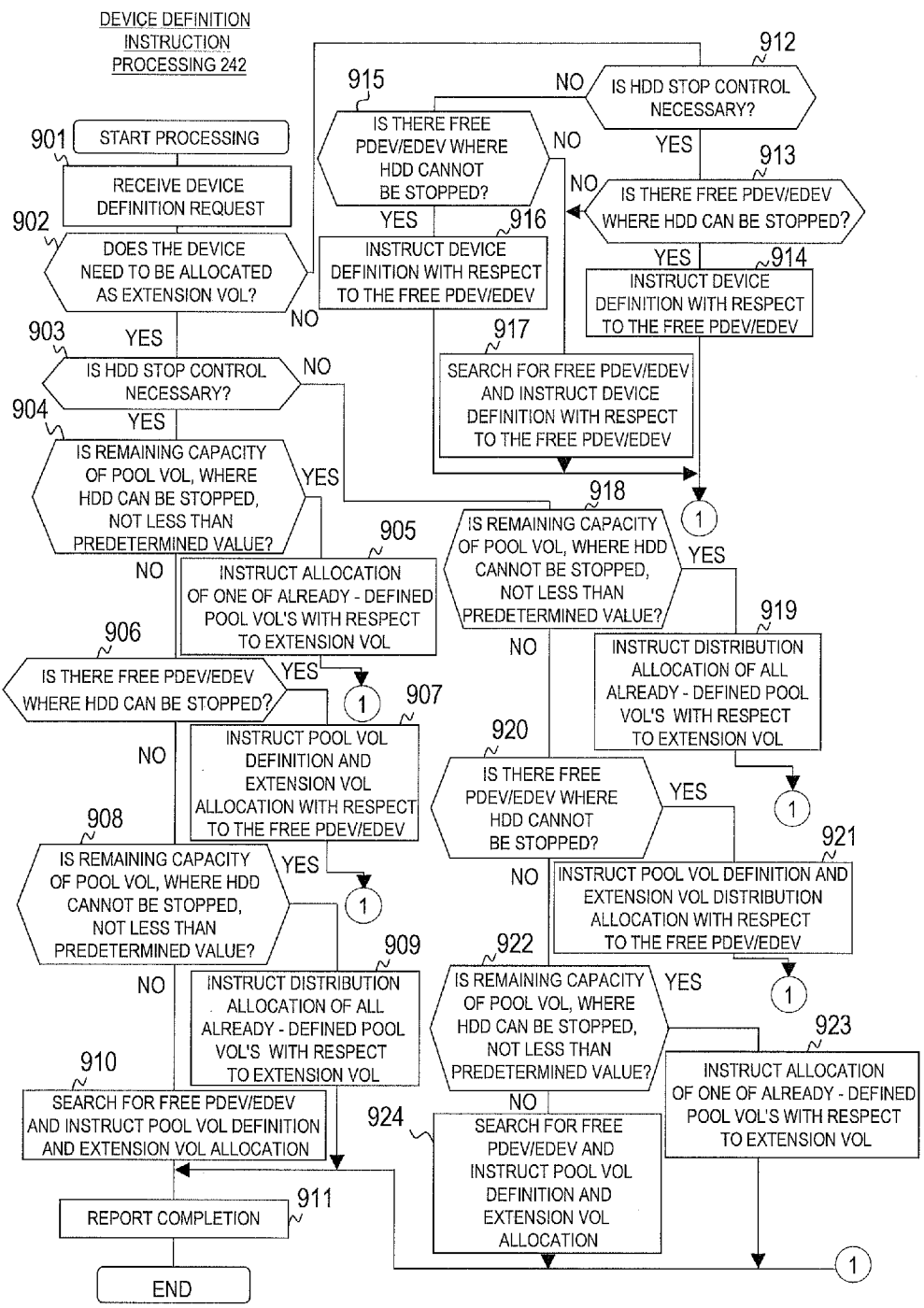
FIG. 9 is a flowchart showing an example of a device definition instruction processing executed on a management server according to the embodiment of this invention.

FIG. 9 is a flowchart showing an example of the device definition instruction processing 242 executed on the management server 110 according to the embodiment of this invention.

In the description of FIG. 9, the processing executed by the management server 110 is actually executed by the CPU 111 executing the device definition instruction processing 242.

The management server 110 receives a definition request of the logical device of the storage system 130 from the user or the application program via the IP network 175 and the interface control unit 116 (step 901). The request includes information such as identification information on the storage system 130 of the request target (the storage system 130), a logical device number of the logical device of the request target (the logical device), access source HBA identifying information, port specifying information, and device attribute information. Here, the access source HBA identifying information is, for example, a WWN. The port specifying information is, for example, a list of the port ID, the target ID, and the LUN of the port 131. The device attribute information is, for example, information indicating whether the logical device can be allocated as the extension VOL and information on usage of the logical device.

First, the management server 110 refers to information in the received device definition request, management access right setting set in the storage system 130, etc., to confirm that the received request is issued from the user or the application program on the host 100 having the management access right for the storage system 130. When confirmed that the request is issued from the user having the management access right, the management server 110 continues the processing.

Next, the management server 110 judges from information in the received device definition request that the logical device is defined as a normal volume or the extension VOL (step 902).

In step 902, when it is judged that the logical device is defined as the extension VOL (in other words, the logical device is allocated as the extension VOL), the management server 110 refers to the information on usage of the logical device, etc., to judge whether the disk drive start/stop control needs to be performed (step 903). "HDD" (Hard disk drive)" in FIG. 9 means the disk drive 137.

For example, the necessity judgment in step 903 may be executed when a flag indicating the start/stop control necessity for the logical device is provided, the user or the like sets this flag during the logical device definition, and the management server 110 refers to this flag. Alternatively, the necessity judgment in step 903 may be executed when the user or the like sets the information indicating the attachment/detachment control necessity, and the management server 110 refers to this information.

Alternatively, an attribute of "WORM (Write Once Read Many)" or "WORF (Write Once Read Few)" etc., may be set as information indicating logical device access frequency and access tendency. For example, when the WORM attribute is set to the logical device, it is estimated that data in the logical device is frequently read (in other words, high access frequency). On the other hand, when the WORF attribute is the logical device, it is estimated that data in the logical device is hardly read (in other words, low access frequency).

Alternatively, the management server 110 may refer to the usage information corresponding to the attribute to estimate the access frequency to the logical device. Here, the usage information is information indicating a type of data stored in the logical device (for example, "DB data" "mail archive data" or "file system") etc.

The logical device estimated to have low access frequency such as such as read/write as a result of reference to the attribute or usage information can expectedly have high effects of power consumption due to disk drive stop. Therefore, the management server 110 may judge that the disk drive start/stop control is necessary in step 903, when the logical device access is estimated to be low frequency.

In step 903, when it is judged that the disk drive start/stop control is necessary, it is desirable to allocate the logical device to the physical device or the external device disk where the drive start/stop control is possible. Otherwise, the disk drive cannot be stopped eventually, and the power consumption reduction effect cannot be obtained. Therefore, the management server 110 judges that the remaining capacity of all pool VOLs corresponding to the physical device or the external device where the disk drive start/stop control is possible, in other words, the total capacity of areas not allocated as the physical storage area of the extension VOL, is not less than the predetermined value (step 904). The remaining capacity of the pool VOLs in step 904 is an estimated value of the remaining capacity of the pool VOLs after the logical device is defined.

In step 904, when it is judged that the remaining capacity of the corresponding pool VOLs is not less than the predetermined value, the already-defined pool VOLs have a sufficient remaining capacity. Therefore, the management server 110 defines an extension VOL corresponding to one of the already-defined pool VOLs and instructs the storage system 130 to allocate the logical device to the extension VOL (step 905).

On the other hand, in step 904, when it is judged that the remaining capacity of the corresponding pool VOLs is less than the set value, the already-defined pool VOLs do not have a sufficient remaining capacity on the device where disk drive start/stop control is possible. In this case, in step 906, the management server 110 checks whether, among the physical devices or the external devices where the disk drive start/stop control is possible, there is a device not allocated to a logical device or a pool VOL (hereinafter, that device is mentioned as free device).

When it is judged that there is a corresponding free device in step 906, the management server 110 defines the new pool VOL and an extension VOL corresponding to the pool VOL for a free device and instructs the storage system 130 to allocate the logical device to the extension VOL (step 907). As a result, the logical device corresponds to the newly-defined one pool VOL. In other words, the one logical device corresponds to one physical device or the external device where the disk drive start/stop control is possible.

On the other hand, in step 906, when it is judged that there is no corresponding free device, eventually, the logical device cannot be allocated to the physical device or the external device where the disk drive start/stop control is possible. In this case, the management server 110 judges whether the remaining capacity of the pool VOL, in which the disk drive start/stop control is impossible, is not less than the predetermined value (step 908).

In step 908, when it is judged that the remaining capacity of the corresponding pool VOLs is not less than the predetermined value, the already-defined pool VOLs have a sufficient remaining capacity. In this case, the management server 110 defines an extension VOL such that the extension VOL is dispersed to plurality of pool VOLs where the disk drive start/stop control is impossible. In other words, the defined extension VOL corresponds to a plurality of (desirably, all) pool VOLs where the disk drive start/stop control is impossible. Then, the management server 110 instructs the storage system 130 to allocate the logical device to the extension VOL (step 909). Here, the extension VOL is dispersed to all pool VOLs to increase the access performance.

On the other hand, in step 908, when it is judged that the remaining capacity of the corresponding pool VOLs is less than the set value, the already-defined pool VOLs do not have a sufficient remaining capacity. In this case, the management server 110 searches for a free device, defines a pool VOL and an extension VOL corresponding to the pool VOL for the free device, and allocates the logical device to the extension VOL (step 910).

On the other hand, in step 903, when it is judged that the disk drive start/stop control is unnecessary, it is desirable to allocate the logical device to the physical device or the external device where the disk drive start/stop control is impossible so that a device where the disk drive start/stop control is possible is left for other logical devices. In this case, first, the management server 110 judges whether the remaining capacity of the pool VOLs where the disk drive start/stop control is impossible is not less than the predetermined value (step 918) in a reversed order in steps 904 to 910.

In step 918, when it is judged that the remaining capacity of the corresponding pool VOLs is not less than the predetermined value, the management server 110 executes step 919. The processing in steps 918 and 919 is the same as that in steps 908 and 909, so its description is omitted.

On the other hand, in step 918, when it is judged that the remaining capacity of the corresponding pool VOLs is less than the set value, the management server 110 checks whether there is a free device where the disk drive start/stop control is impossible (step 920).

In step 920, when it is judged that the corresponding free device exists, the management server 110 defines one or more new pool VOLs and extension VOLs corresponding to the pool VOLs for the one or more free devices, and instructs the storage system 130 to allocate the logical device to the extension VOL (step 921). As a result, the logical device corresponds to the newly-defined one or more pool VOLs. At this time, such definition may be made that one pool VOL corresponds to a plurality of free devices and the one pool VOL corresponds to one extension VOL. Alternatively, such definition may be made that one pool VOL corresponds to one free device and a plurality of pool VOLs corresponds to one extension VOL.

On the other hand, in step 920, when it is judged that no corresponding free device exists, the management server 110 judges whether the remaining capacity of all pool VOLs corresponding to the physical device or the external device where the disk drive start/stop control is possible is not less than the predetermined value (step 922).

In step 922, when it is judged that the remaining capacity is not less than the predetermined value, the management server 110 executes step 923. On the other hand, in step 922, when it is judged that the remaining capacity is less than the set value, the management server 110 executes step 924. The processing in steps 922, 923, and 924 is the same as that in steps 904, 905, and 910, so its description is omitted.

Based on the result of the above processing, when an allocation target of the logical device is a pool VOL disk drive start/stop control is possible, such definition is made that the extension VOL corresponds to one pool VOL. On the other hand, an allocation target of the logical device is a pool VOL disk drive start/stop control is impossible, such definition is made that the extension VOL corresponds to all pool VOLs that are already specified. As a result, when the disk drive start/stop control is necessary, by consolidating data of one logical device to a particular pool VOL, the number of the disk drives 137 relating to the disk drive start/stop control can be limited. As a result, the disk drive start/stop control is facilitated.

On the other hand, when the disk drive start/stop control is unnecessary, by dispersing data of one logical device to the plurality of disk drives 137, thereby improving the access performance.

On the other hand, in step 902, when it is judged that the logical device is not defines as the extension VOL (in other words, the logical device is defined as a normal volume), the management server 110 refers to information in the received request to judge whether the disk drive start/stop control is necessary (step 912). This judgment is executed as in step 903.

In step 912, when it is judged that the disk drive start/stop control is necessary, the management server 110 judges whether there is a free device where disk drive start/stop control is possible (step 913).

In step 913, when it is judged that there is a free device where the disk drive start/stop control is possible, the management server 110 instructs the storage system 130 to allocate the logical device to the free device (step 914).

On the other hand, in step 913, when it is judged that there is no free device where the disk drive start/stop control is possible, the management server 110 searches the entire storage system 130 for a free device, and then instructs the storage system 130 to allocate the logical device to the free device (step 917).

On the other hand, in step 912, when it is judged that the disk drive start/stop control is unnecessary, the management server 110 judges whether there is a free device where the disk drive start/stop control is impossible (step 915).

In step 915, when it is judged that there is a free device where the disk drive start/stop control is impossible, the management server 110 instructs the storage system 130 to allocate the logical device to the free device (step 916).

On the other hand, in step 915, when it is judged that there is no free device where the disk drive start/stop control is impossible, the management server 110 executes step 917.

When processing of step 905, 907, 909, 910, 914, 916, 917, 919, 921, 923, or 924 completes, the management server 110 reports the user or the application program about the processing completion (step 911). The processing thus ends.

Figure 10:
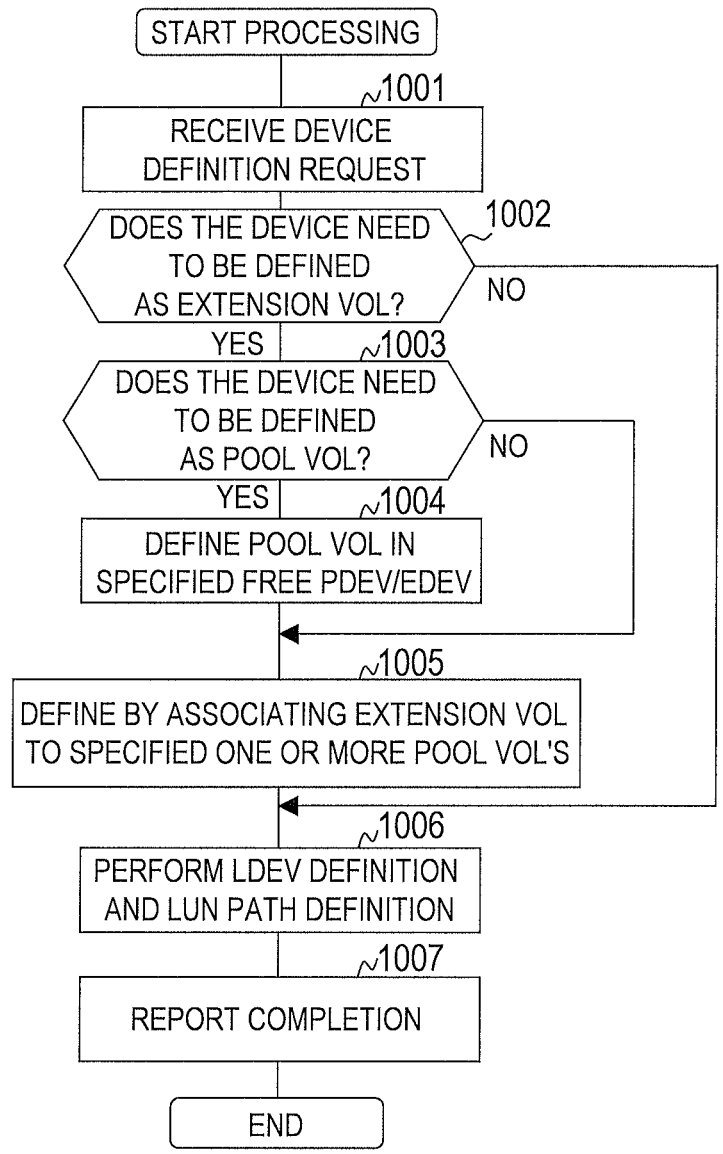
FIG. 10 is a flowchart showing an example of a device definition processing executed on the storage system according to the embodiment of this invention.

FIG. 10 is a flowchart of an example of the device definition processing 224 executed in the storage system 130 according to the embodiment of this invention.

In the description of FIG. 10, the processing executed by the storage system 130 is actually executed by the control processor 132 executing the device definition processing 224.

First, the storage system 130 receives a logical device definition request from the management server 110 (step 1001). The request is an instruction issued in the device definition instruction processing 242 in step 905, 907, 909, 910, 914, 916, 917, 919, 921, 923, or 924 of FIG. 9. The received request includes information received from the management server 110 in step 901 of the device definition instruction processing 242. When the logical device (the logical device) of the request target is specified as a normal volume, the received request further includes a physical device number or external device number of the allocation target logical device. When the logical device is defined as an extension VOL, the receive request further includes a newly-assigned extension VOL number and a pool VOL number of an allocation target of its extension VOL, or a newly-assigned extension VOL number and a pool VOL number, and a physical device number or external device number of an allocation target of its pool VOL, etc.

Next, the storage system 130 refers to information in the received request to judge whether the logical device is defined as an extension VOL (step 1002). For example, when the storage system 130 receives the instruction in step 905, 907, 909, 910, 919, 921, 923, or 924 of FIG. 9, it is judged that the logical device is defined as an extension VOL. On the other hand, when the storage system 130 receives the instruction in step 914, 916, or 917 of FIG. 9, it is judged that the logical device is defined as a normal volume.

In step 1002, when it is judged that the logical device is not defined as an extension VOL (in other words, the logical device is defined as a normal volume), it is unnecessary to execute processing relating the pool VOL. In this case, processing proceeds to step 1006.

On the other hand, in step 1002, when it is judged that the logical device is defined as an extension VOL, the pool VOL needs to be allocated to the extension VOL. Therefore, the storage system 130 judges whether a new pool VOL needs to be defined (step 1003). For example, when the storage system 130 receives the instruction in step 907, 910, 921, or 924 of FIG. 9, it is judged that a new pool VOL needs to be defined. On the other hand, when the storage system 130 receives the instruction in step 905, 909, 919, or 923 of FIG. 9, it is judged that a new pool VOL does not need to be defined.

In step 1003, when it is judged that a new pool VOL does not need to be defined, the processing proceeds to step 1005.

On the other hand, in step 1003, when it is judged a new pool VOL needs to be defined, the storage system 130 defines a pool VOL for the physical device or the external device specified by the received request (step 1004).

Specifically, for an information entry corresponding to the pool VOL number specified in the pool VOL management information 208 of FIG. 8, the storage system 130 sets a physical device number or external device number of an allocation target in the physical/external device number 805. Further, the storage system 130 refers to the pool VOL management information 208 to set the size 802 and the corresponding disk drive stop/unstop flag 809. Further, the storage system 130 initializes the following to set the free area 803 as a value of the size 802, the VOL state 804 as "detach", the corresponding extension VOL number list 808 as an invalid value, the stop flag 810 as "On" indicating the start, and the last start/stop time 811 as the current time. In the pool entry size 806, a value fixed at the storage system 130 or a logical device allocating instruction from the user may be set. The pool entry allocating state management information 807 is initialized so that all entries are unallocated to the extension VOL.

Next, in the storage system 130, the pool VOL specified in step 1004, or the pool VOL specified by the received request corresponds to the extension VOL to define the extension VOL (step 1005).

Specifically, for information entry of the extension VOL management information 207 corresponding to the specified extension VOL number and information entry of the pool VOL management information 208 of the pool VOL (the pool VOL) corresponding to the extension VOL, the storage system 130 sets the extension VOL number in the corresponding extension VOL number list 808 and "attach" in the VOL state 804, respectively. Further, the storage system 130 sets a logical device size corresponding to the extension VOL in the size 702, an invalid value in the corresponding logical device number 703, "detach" in the VOL state 704, "On" in the stop flag 705, the current time in the last start/stop time 706, the pool VOL number in the corresponding pool number list 707, and "0" in the real area allocation total amount. The pool entry corresponding management information 708 is initialized so that all entries are unallocated to the extension VOL.

Next, the storage system 130 defines the logical device for the extension VOL (step 1006).

Specifically, in the corresponding logical device management information 201 and the extension VOL management information 207, the storage system 130 sets the corresponding logical device number logical device number in the logical device number 703 and "attach" in the VOL state 704, respectively. Further, the storage system 130 sets contents instructed by the received request in the size 302 and the type 304, the extension VOL number in the corresponding downstream device number 303, "detach" in the device state, invalid values in the entries 306 to 309, "Off" in the migrating data flag 310, "On" in the stop flag 311, and the current value in the last start/stop time 312.

Further, in step 1006, the storage system 130 executes LUN path definition on the specified port 131.

Specifically, in the corresponding logical device management information 201 and the LU path management information 202, the storage system 130 sets port information specified by the received request in the entry 306 and 307. Further, the storage system 130 sets information on the connection host 100 specified by the received request in the entries 402 and 404. Further, the storage system 130 the logical device number in the corresponding logical device number 403.

Next, the storage system 130 informs the management server 110 of the processing completion (step 1007).

On the other hand, when the logical device is defined as a normal volume, the storage system 130 defines the logical device to the specified free physical device or external device, executes the LUN path definition, and reports the processing completion (steps 1002, 1006, and 1007). Specifically, the storage system 130 sets necessary information in the corresponding logical device management information 201 and the physical device management information 202 or the external device management information 203.

For the free physical device or external device, when the corresponding disk drive 135 or 156 is stopped, the storage system 130 judges whether the free device that is an allocation target of the pool VOL or the normal volume is stopped in steps 1004 and 1006. When it is stopped, the storage system 130 needs to execute device start/stop processing 222 described later to start disk drive 137 or 156 corresponding to the free device.

Next, attachment/detachment processing and stopped device monitoring processing of the logical device will be described. To execute the attachment/detachment processing of the logical device, the management server 110 executes device connection switching instruction processing 241, the storage system 130 executes the device connection switching processing 221 and the device start/stop processing 222, and the external storage system 150 executes I/O processing 261 and external device start/stop processing 262. In the I/O processing 261, access prevention to the logical device where the corresponding physical device stops is considered. Also, to execute the stopped device monitoring processing, the storage system 130 executes the stopped device monitoring processing 223 and the device migration processing 225.

Figure 11:
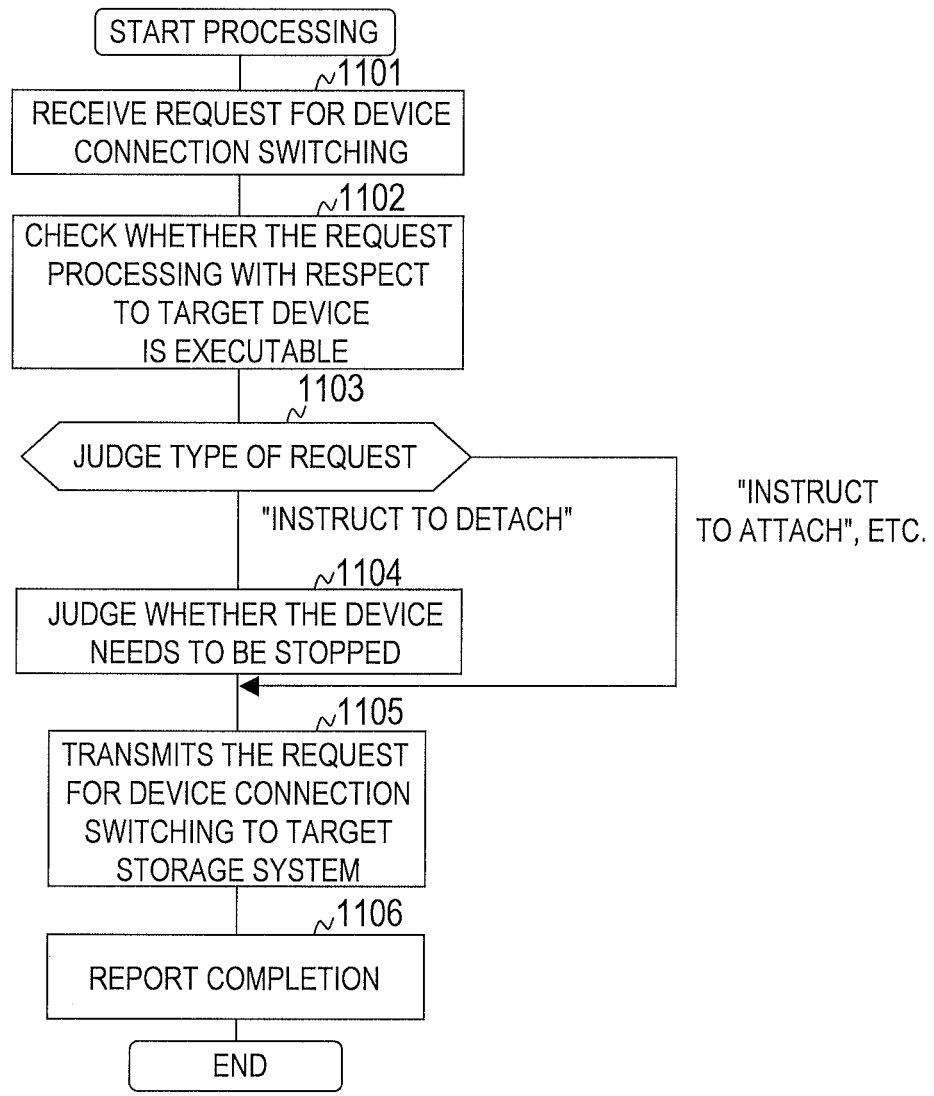
FIG. 11 is a flowchart showing an example of a request processing for device connection switching executed on a management server according to the embodiment of this invention.

FIG. 11 is a flowchart of an example of the request processing for device connection switching 241 executed by the management server 110 according to the embodiment of this invention.

Hereinafter, detailed description of processing similar to the processing described above is omitted.

In the description of FIG. 11, the processing executed by the management server 110 is actually executed by CPU 111 executing the request processing for device connection switching 241.

The management server 110 receives an attach request or a detach request to the logical device (hereinafter, referred to as logical device) having the storage system 130, via the IP network 175 and the interface control unit 116, from the user or the application program (step 1101). The received request includes, for example, the connection switching content (detach or attach), device stop judgment information, access source HBA identifying information (WWN, etc.), port specifying information (port ID and target ID of the port 131 and the LUN list, etc.), and target device specifying information (identification information of the storage system 130 and logical device number).

Next, the management server 110 judges whether the received request is executable (step 1102). Specifically, for example, the management server 110 refers to an access right set in the logical device, etc. to check whether the received request is sent from the user the application program on the host 100 which are allowed to access the logical device.

When the received request is executable, the management server 110 judges a type of the received request (step 1003). Specifically, the management server 110 judges whether the received request content is "detach of the logical device".

In step 1003, when it is judged that the received request is "detach of the logical device", the management server 110 refers to the device stop judgment information in the received request, etc. to judge whether the logical device needs to be stopped (step 1104). The device stop judgment information at this time may be a flag indicating stop/unstop set in the detach request. Alternatively, an expected period during which the logical device is detached is set and when this period is not less than the predetermined value, judgment may be made where the logical device needs to be stopped. Alternatively, instead of the expected period, a detach period is set, and based on the detach period, the device stop/unstop judgment in step 1104 and automatic attach, etc. of the detach period expiration may be controlled. Alternatively, information indicating expected access frequency to the logical device of the detach target may be set to judge that the device expected to have low access frequency is stopped.

For example, attribute such as "WORF" described above is previously set in a device storing data such as mail archive data saved for a long time for audits, which is usually "written once and hardly referred to until the next audit". When detach of the device to which the WORF attribute is set is instructed, irrespective of whether there is a user's specification, it may be judged to stop the logical device. Alternatively, without judging whether the stop is necessary when detach of the logical device is instructed, it may be judged to stop unconditionally.

However, the upper limit of the times of stopping the disk drive 137 is generally determined and operation for the stop processing beyond the upper limit leads to failure. Therefore, the number of stops is desirably managed for each disk drive 137 to prevent stop at high frequency. Also, the storage system 130 may manage the number of stops. In other words, the management server 110 may manage the number of stops such that attachment/detachment instructions or start/stop institutions of the logical device are not issued to avoid such result that the particular disk drive 137 is started/stopped more than the predetermined times in a given period of time. Alternatively, the management server 110 unconditionally issues attachment/detachment instructions, etc., and the storage system 130 receiving the instructions detects excess of the predetermined times and may reject or ignore the instructions.

Next, the management server 110 transmits to the storage system 130 a request of attach or detach of the logical device (step 1105), receives a completion report from the storage system 130, and then notifies the user or the application program of the processing completion (step 1106).

Figure 12:
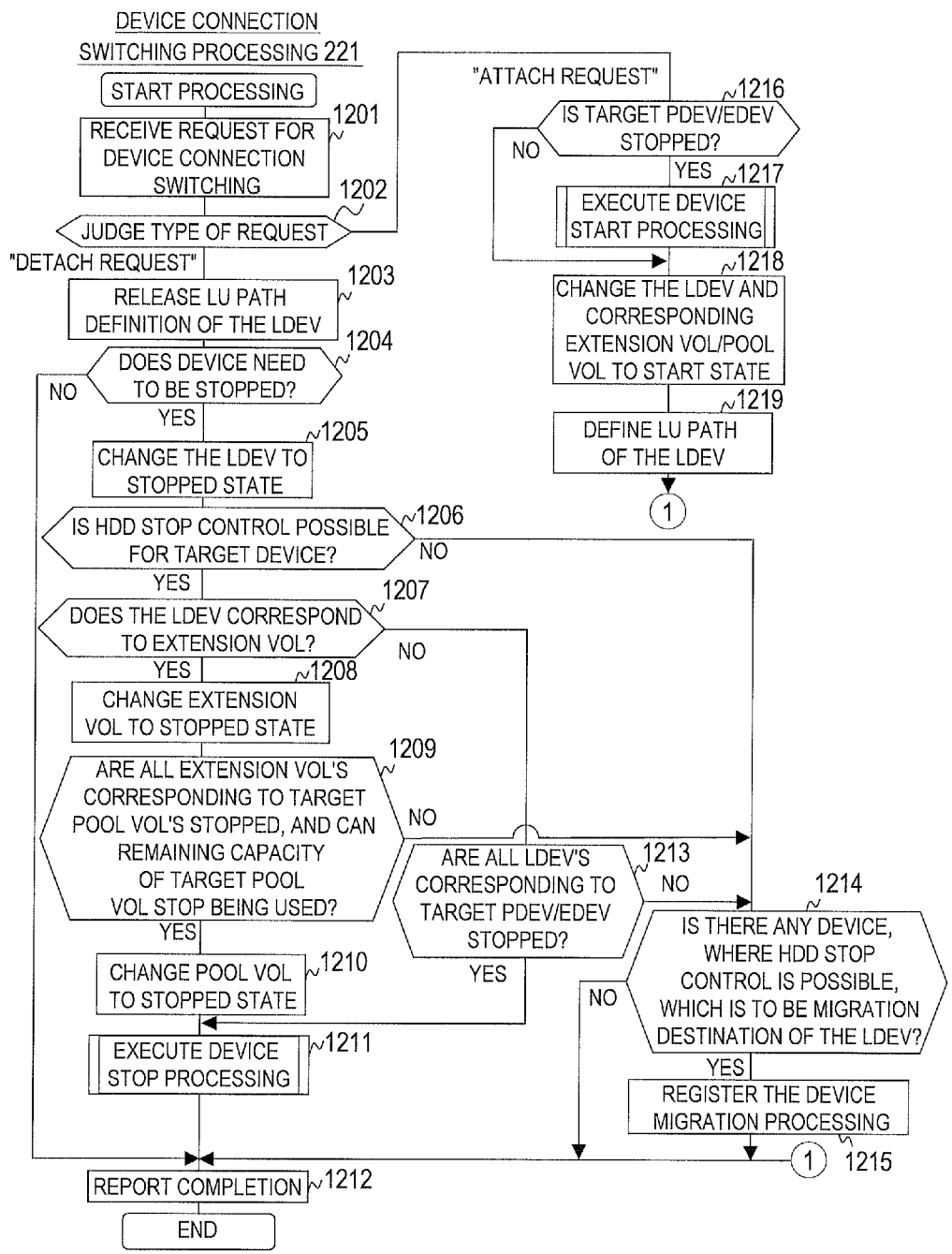
FIG. 12 is a flowchart showing an example of a device connection switching processing executed on the storage system according to the embodiment of this invention.

FIG. 12 is a flowchart of an example of the device connection switching processing 221 executed by the storage system 130 according to the embodiment of this invention.

In the description of FIG. 12, the processing executed by the storage system 130 is actually executed by control processor 132 executing the device connection switching processing 221.

The storage system 130 receives a connection switching request of the logical device from the management server 110 via the IP network 175, the service terminal 140, and the interface control unit 138 (step 1201). Here the received connection switching request is an attach request or a detach request. The received request includes almost the same information as that of the switching request received by the management server 110 in step 1101. However, the request received in step 1201 includes, instead of the device stop/unstop judgment information, a device stop/unstop flag that is a judgment result in the management server 110.

Next, the storage system 130 refers to access right information to the logical device to the received request target (logical device), etc. to judge whether the received request is executable. When the request is not executable, the storage system 130 notifies the management server 110 of that effect to complete the processing. When the request is executable, the storage system 130 judges a type of the received request (step 1202). Specifically, it is judged that the received request is a detach request or an attach request.

In step 1202, when it is judged that the request is a detach request, the storage system 130 first releases the LU path definition set in the logical device (step 1203). Specifically, in an area corresponding to the logical device of the logical device management information 201, the storage system 130 erases contents of the entries 306 and 307, changes the state of the device state 305 to "detached", and erases contents of entries 403 and 404 where the port number, target ID, and LUN corresponding to the logical device of the LU path definition information 202 are stored.

Next, the storage system 130 judges whether stop of the logical device is instructed in the request received from the management server 110 (step 1204).

In step 1204, when it is judged that stop of the logical device is not instructed, the storage system 130 notifies the management server 110 of the processing completion (step 1212) to completes the processing.

On the other hand, in step 1204, when it is judged that stop of the logical device is instructed, the storage system 130 changes the state of the logical device as stopped (step 1205). Specifically, the storage system 130 sets the stop flag 306 of the logical device management information 201 "Off".

Next, the storage system 130 refers to the corresponding disk drive stop/unstop flag 510, 611, or 809 to judge whether start/stop control for the physical device corresponding to the logical device, the disk drive 137 corresponding to the external device or the pool VOL, etc. is possible (step 1266). Here, a case where start/stop control for the disk drive 137 etc. corresponding to the pool VOL is possible means that start/stop control for the disk drive 137 structuring the physical device corresponding to the pool VOL is possible or start/stop control for the disk drive 157 structuring the external device corresponding to the pool VOL is possible.

In step 1206, when it is judged that the start/stop control is possible, the storage system 130 judges whether the logical device corresponds to the extension VOL (in other words, whether the logical device corresponds to the pool VOL via the extension VOL (step 1207). Specifically, the storage system 130 refers to the corresponding downstream device number 303 on the logical device for the judgment.

In step 1207, when it is judged that the logical device corresponds to the extension VOL, the extension VOL is set as stopped (step 1208).

Next, the storage system 130 refers to the corresponding pool number list 707 relating the extension VOL, and the pool VOL corresponding to the extension VOL is specified. Then, the storage system 130 judges whether all extension VOLs corresponding to the pool VOL are stopped and use of the remaining capacity of the pool VOL can be stopped (step 1209). Here, "all extension VOLs corresponding to the pool VOL are stopped" means that all logical devices corresponding to the extension VOL are stopped. Then, "use of the remaining capacity of the pool VOL can be stopped" means that even when the remaining capacity of the pool VOL cannot be used, operation for the other extension VOLs can be maintained by using other operating pool VOLs.

In step 1209, when it is judged that all extension VOLs corresponding to the pool VOL are stopped and use of the remaining capacity of the pool VOL can be stopped, the pool VOL can be stopped. In other words, the disk drive 137 corresponding to the pool VOL can be stopped. In this case, the storage system 130 sets the pool VOL as stopped (step 1210).

Next, the storage system 130 calls the device start/stop processing 222 to stop the physical device or the external device (step 1211).

On the other hand, in step 1207, when it is judged that the logical device corresponds to the normal volume, not the extension VOL, the storage system 130 refers to the corresponding downstream device number 303 relating to the logical device to specify the physical device or the external device to which the logical device corresponds. Then, the storage system 130 judges whether the specified physical device or all the logical devices corresponding to the external device is stopped (step 1213).

In step 1213, when it is judged that the physical devices to which the logical device corresponds or all logical devices corresponding to the external device are stopped, the physical device or the external device can be stopped. In other words, the physical device or the disk drive 137 corresponding to the external device can be stopped. In this case, the storage system 130 stops the physical device or the external device (step 1211).

On the other hand, when it is judged that the pool VOL cannot be stopped in step 1209, the physical device or the external device cannot be stopped in step 1213 and start/stop control for the physical device corresponding to the logical device and the disk drive 137 corresponding to the external device or the pool VOL is impossible in step 1206, the disk drive 137 cannot be stopped. However, in those cases, the logical device of the detach target is migrated to another physical device, etc., and the disk drive 137 can sometimes be stopped.

Therefore, to migrate the logical device to another physical device, external device, or pool VOL, the storage system 130 searches a free device or the free pool VOL that is a migration destination where the disk drive start/stop control is possible, to judge whether the corresponding free device or the free pool VOL exists (step 1214). The processing executed in step 1214 will be described later while referring to FIG. 18.

In step 1214, when it is judged that the corresponding free device or the like exists, the storage system 130 registers the device migration processing of the logical device (step 1215). Specifically, the control memory 135 stores a migration source logical device number and registration information including migration destination physical device number or a migration destination external device number, etc. The stored registration information is periodically checked by the device migration processing 225 described later. Then, registration information is stored, the device migration processing 225 migrate the device.

On the other hand, in step 1202, when it is judged that the request received from the management server 110 is an attach request, the storage system 130 specifies the physical device, the external device, or the pool VOL corresponding to the logical device. Then, the storage system 130 refers to the physical device management information 203, the external device management information 204, or the pool VOL management information 208 to judge whether the specified physical device, the external device, or the pool VOL stops (step 1216).

In step 1216, when it is judged that the specified physical device or the like stops, the storage system 130 calls the device start/stop processing 222 to start the specified physical device, the specified external device, or the physical device or the external device corresponding to the specified pool VOL (step 1217).

Next, if necessary, the storage system 130 starts the corresponding extension VOL and the pool VOL to start the logical device. Specifically, the storage system 130 sets the stop flag of each management information "On" (step 1218).

Next, the storage system 130 defines the LU path (step 1219). Specifically, the storage system 130 sets the port specifying information specified by the received request in the entry 307 of an area corresponding to the logical device of the logical device management information 201 and changes the device state 305 to "attached". Further, the storage system 130 sets the logical device number and access source HBA identifying information in the entries 403 and 404 of areas corresponding to the target port, the target ID, and the LUN among the LU path definition information 202, respectively.

Figure 13:
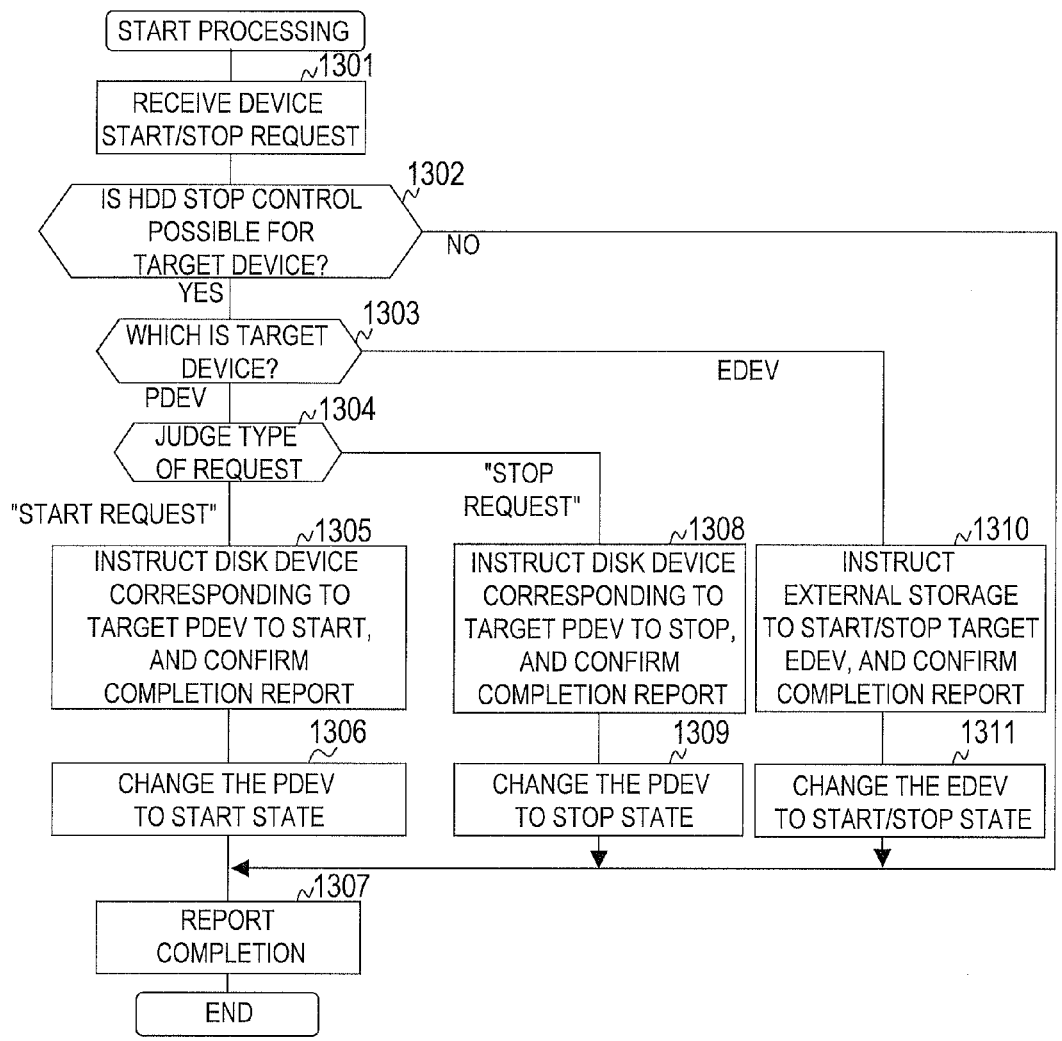
FIG. 13 is a flowchart showing an example of a device start/stop processing executed on the storage system according to the embodiment of this invention.

FIG. 13 is a flowchart showing an example of the device start/stop processing 222 executed by storage system 130 according to the embodiment of this invention.

In the description of FIG. 13, the processing executed by the storage system 130 is actually executed by the control processor 132 executing the device start/stop processing 222.

The storage system 130 receives a start request or a stop request of the logical device from the device connection switching processing 221 or the like (step 1301). The received request includes, for example, request content identification information (start/stop) and target device specifying information (physical device number or external device number).

Next, the storage system 130 judges whether the disk drive start/stop control for the processing target device of the received request is possible (step 1302).

In step 1302, when it is judged that the disk drive start/stop control is impossible, start or stop control for the disk drive 137 corresponding to processing target physical device or the like cannot be performed. In this case, the storage system 130 does not execute start or stop of the disk drive 137, and notifies the request source of the requested processing completion (step 1307).

On the other hand, in step 1302, when it is judged that the disk drive start/stop control is possible, the storage system 130 judges whether the processing target of the received request is a physical device or an external device (step 1303).

In step 1303, when it is judged that the processing target is the physical device, the storage system 130 judges whether the received request is a start request or a stop request (step 1304).

In step 1304, when it is judged that the received request is the start request, the storage system 130 starts the disk drive 137 corresponding to a request target physical device in step 1305 to change the physical device to a started state (step 1306).

Specifically, the control processor 132 transmits a disk rotation start instruction command to the disk drive 137. A controller (not shown) in the disk drive 137 follows the command to start the disk rotation, and then notifies the control processor 132 of the processing completion. The control processor 132 checks the processing completion notification from the disk drive 137 and allows input/output of the disk drive 137 to be executed. Then, the control processor 132 sets the stop flag 505 "On" of the physical device management information 203 corresponding to the physical device of the request target.

On the other hand, in step 1304, when it is judged that the received request is the stop request, the storage system 130 stops the disk drive 137 corresponding to a request target physical device in step 1308 to change the physical device to a stopped state (step 1309).

Specifically, the control processor 132 transmits a disk rotation stop instruction command to the disk drive 137. The controller in the disk drive 137 follows the command to stop the disk rotation, and then notifies the control processor 132 of the processing completion. The control processor 132 checks the processing completion notification from the disk drive 137. Then, the control processor 132 sets the stop flag 505 "Off" of the physical device management information 203 and sets the last stop time 506 as the stop processing excretion time.

On the other hand, in step 1303, when it is judged that the processing target is an external device, the storage system 130 transmits a command of instructing start or stop of the external device to the external storage system 150 of the request target (step 1310).

The storage system 130 receives the processing completion notification from the external storage system 150 and updates external device management information 205 to change the start/stop state of the external device (step 1311).

When processing of step 1306, 1309, or 1311 completes, the storage system 130 notifies the request source of the requested processing completion in step 1307 to complete device start/stop processing 222.

The command for instructing disk rotation start or stop to the disk drive 137 is, for example, a START STOP UNIT command of the SCSI protocol.

Figure 14:
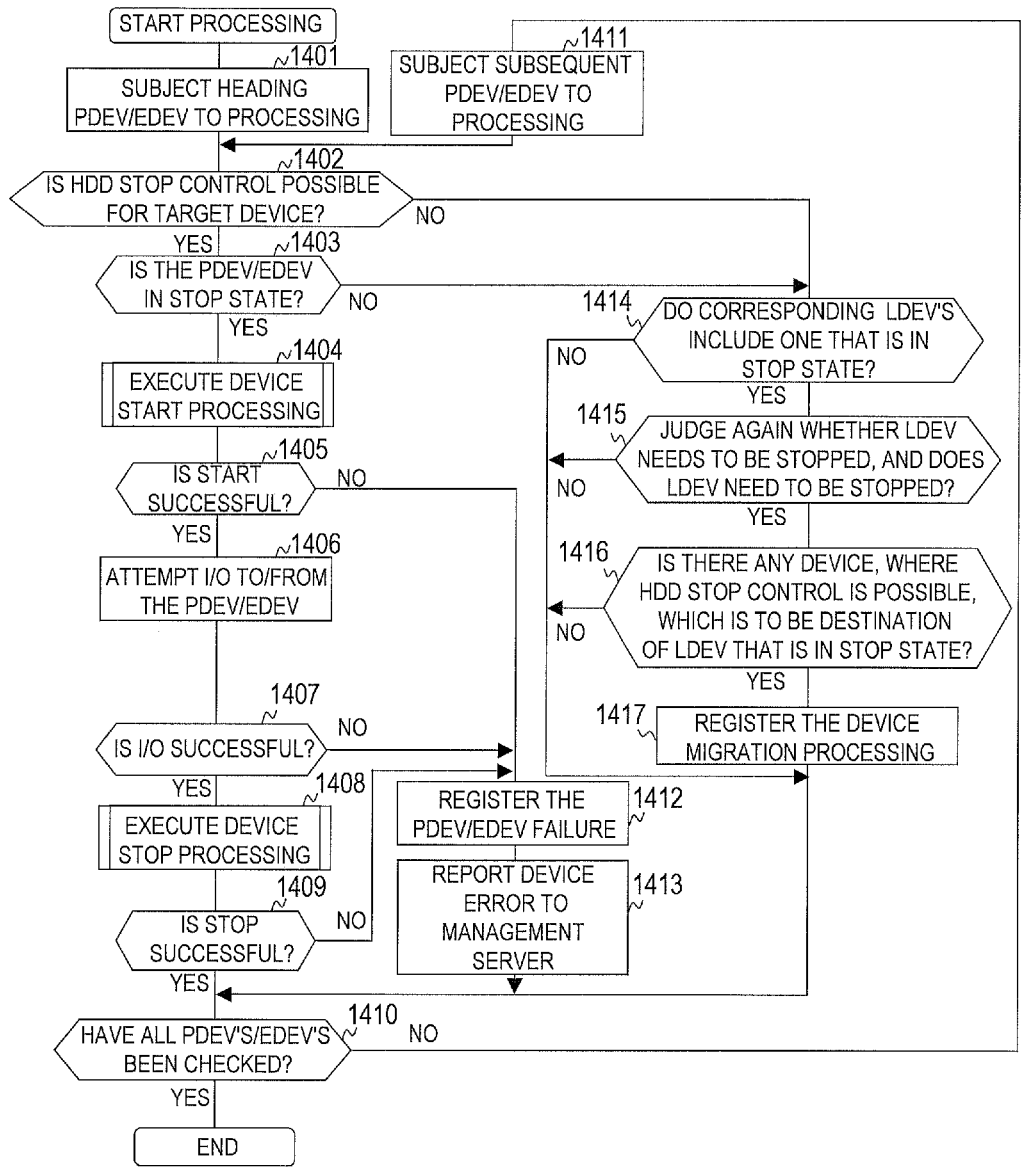
FIG. 14 is a flowchart showing an example of a stopped device monitoring processing executed on the storage system according to the embodiment of this invention.

FIG. 14 is a flowchart of an example of the stopped device monitoring processing 223 executed by the storage system 130 according to the embodiment of this invention.

The stopped device monitoring processing 223 is processing for monitoring whether stopped physical devices etc., normally operate (in other words, whether those stopped physical devices etc., have any failure).

In the description of FIG. 14, the processing executed by the storage system 130 is actually executed by control processor 132 executing the stopped device monitoring processing 223.

First, the storage system 130 sets the head physical device or external device as the processing target (step 1401).

Next, the storage system 130 judges whether the disk drive start/stop control for the physical device or external device of the processing target is possible (step 1402).

In step 1402, when it is judged that the disk drive start/stop control for the physical device or external device of the processing target is possible, the storage system 130 judges whether the physical device or external device of the processing target stops (in other words, the stop flag 505 or 605 is "Off") (step 1403).

In step 1403, when it is judged that the physical device or external device of the processing target stops, the storage system 130 sets the physical device or the external device as the operation check processing target. Then, the storage system 130 starts operation check for the physical device or external device of the processing target (step 1404).

Next, the storage system 130 judges whether the start in step 1404 is successful (step 1405).

When it is judged that the start is successful in step 1405, the storage system 130 executes a test I/O operation check for the physical device or external device of the processing target (step 1406). The test I/O is an I/O executed to check whether the physical device, etc., operates normally. The test I/O content may be diagnosing command transmission such as sense information reference or read access of the user data itself. Alternatively, the content may be read/write access of the free device or the free space in the device.

Next, the storage system 130 judges whether the test I/O in step 1406 is successful (step 1407).

In step 1407, when it is judged that the test I/O is successful, the storage system 130 stops the started physical device or external device (step 1408).

Next, the storage system 130 judges whether the stop in step 1408 is successful (step 1409).

When it is judged that the stop in step 1408 is successful in step 1409, the physical device or external device of the operation check processing target operates normally. In this case, the storage system 130 judges whether processing for all the physical devices and external devices completes (step 1410).

In step 1410, when it is judged that processing for all the physical devices and external devices is not completed, the next physical device or external device is set as the processing target (step 1411), and the processing returns to step 1402.

On the other hand, when it is judged that the start fails in step 1405, when it is judged that the test I/O fails in step 1407, and when it is judged that the stop fails in step 1409, the physical device or external device of the operation check processing target does not normally operate due to occurrence of failure. In this case, the storage system 130 registers the fact that the physical device or the external device of the operation check processing target is blocked in step 1412, and transmits an error report of the device to the management server 110 (step 1413). After that, the processing proceeds to step 1410.

On the other hand, in step 1402, when it is judged that the disk drive start/stop control for the physical device or external device of the processing target is impossible, and when it is judged that in step 1403, the physical device or external device of the processing target is not stopped (in other words, in the started state), the storage system 130 judges whether there is a stopped device among one or more logical devices corresponding to the device of the processing target (corresponding logical device) (step 1414).

In step 1414, when it is judged that there is a stopped device among the corresponding logical devices, the storage system 130 rejudges about the control necessity for the stopped logical device (step 1415). This rejudgement may be executed by a method similar to that in step 1104 in the request processing for device connection switching 241 of the management server 110.

In step 1415, when it is judged that the stopped logical device still has a necessity for stop, the storage system 130 searches for a free physical device, external device, or pool VOL where the disk drive start/stop control is possible, or a replaceable logical device, which is the migration destination of the stopped logical device. Then, the storage system 130 judges whether the corresponding free device, pool VOL, or logical device exists (step 1416). The processing executed in step 1416 will be described in detail while referring to FIG. 18.

In step 1416, when it is judged that the corresponding device exists, similarly to step 1215, the storage system 130 registers the logical device migration request (step 1417). The processing in step 1417 is similar to the device connection switching processing 221 in step 1215 as shown in FIG. 12.

On the other hand, when it is judged that no stopped device exists among the logical devices in step 1414, when it is judged that the stopped logical device has no necessity for stop in step 1415, and when it is judged that the corresponding device exists in step 1416, the storage system 130 gives up the processing for the physical device or external device of the processing target, and the processing proceeds to step 1410.

In step 1410, when it is judged that processing for the physical device and external device is not completed, the stopped device monitoring processing 223 ends.

In step 1214 of FIG. 12 and step 1416 of FIG. 14, for the particular stopped logical device, the disk drive 137 etc. corresponding to the physical device, external device, or pool VOL to which the logical device belongs cannot be stopped. Therefore, the storage system 130 judges whether the logical device can be migrated to a free space of another physical device, external device, or pool VOL or whether the logical device can be replaced with another logical device. An example of this judgment processing will be described while referring to FIG. 18.

Figure 18:
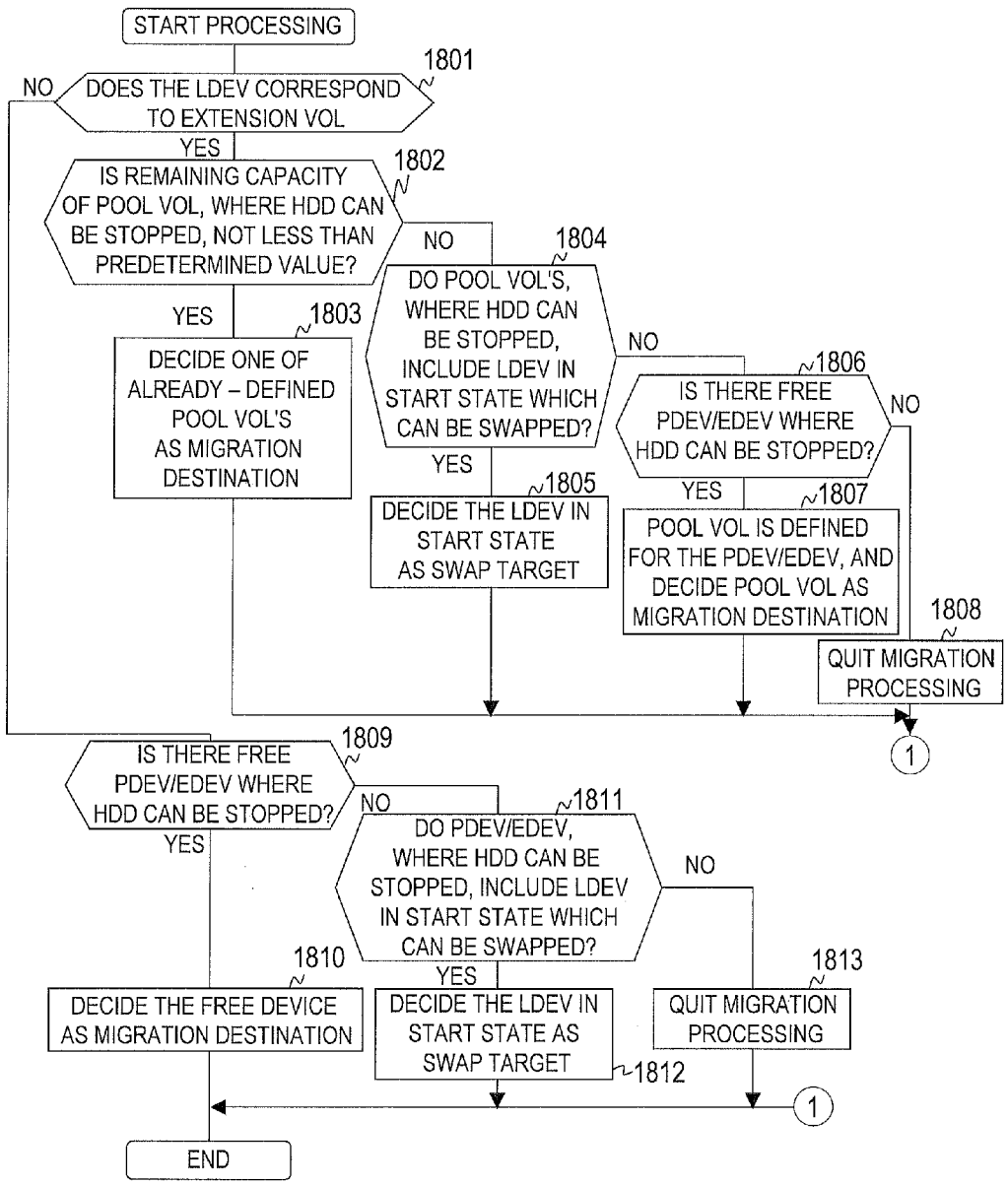
FIG. 18 is a flowchart showing an example of a device migration determination processing executed on the storage system according to the embodiment of this invention.

FIG. 18 is a flowchart of an example of the device migration judgment processing executed by the storage system 130 of the embodiment of this invention.

In the description of FIG. 18, the processing executed by the storage system 130 is actually executed by the control processor 132.

The storage system 130 first judges whether the logical device corresponds to the extension VOL (step 1801).

In step 1801, when it is judged that the logical device corresponds to the extension VOL, the storage system 130 judges whether the total capacity of the pool VOLs where the disk drive start/stop control is possible is not less than the predetermined value (step 1802).

In step 1802, when it is judged that the total capacity of the pool VOLs is not less than the predetermined value, the storage system 130 determines one of the already-defined pool VOLs as the migration target (step 1803).

On the other hand, in step 1802, when it is judged that the total capacity of the pool VOLs is less than the predetermined value, the storage system 130 judges whether a second logical device replaceable with the logical device exists in the pool VOLs where the disk drive start/stop control is possible (step 1804).

In step 1804, when it is judged that the second logical device replaceable with the logical device exists, the logical device is determined as the logical device-replacing target (step 1805).

On the other hand, in step 1804, when it is judged that no second logical device replaceable with the logical device exists, the storage system 130 judges whether a free physical device or external device where the disk drive start/stop control is possible exists (step 1806).

In step 1806, when it is judged that the free physical device or external device where the disk drive start/stop control is possible exists, the storage system 130 defines a new pool VOL for the physical device or external device. Further, the storage system 130 determines the defined pool VOL as the migration destination of the logical device (step 1807).

On the other hand, in step 1806, when it is judged that no free physical device or external device where the disk drive start/stop control is possible exists, the storage system 130 gives up the logical device migration processing (step 1808).

On the other hand, in step 1801, when it is judged that the logical device does not correspond to the extension VOL (in other words, the logical device corresponds to a normal volume), the storage system 130 judges whether a free physical device or external device where the disk drive start/stop control is possible exists (step 1809).

In step 1809, when it is judged that the free physical device or the like where the disk drive start/stop control is possible exists, the storage system 130 determines the device as the migration target (step 1810).

On the other hand, in step 1809, when it is judged that no free physical device or the like where the disk drive start/stop control is possible exists, the storage system 130 judges whether a second logical device replaceable with the logical device exists in the physical device or external device where the disk drive start/stop control is possible (step 1811).

In step 1811, when it is judged that the corresponding second logical device exists, the storage system 130 determines the second logical device as the logical device-replacing target (step 1812).

On the other hand, in step 1811, when it is judged that no corresponding second logical device exists, the storage system 130 gives up the logical device migration processing (step 1813).

When the storage system 130 executes step 1803, 1805, 1807, 1808, 1810, 1812, or 1813, the device migration judgment processing ends.

Figure 15:
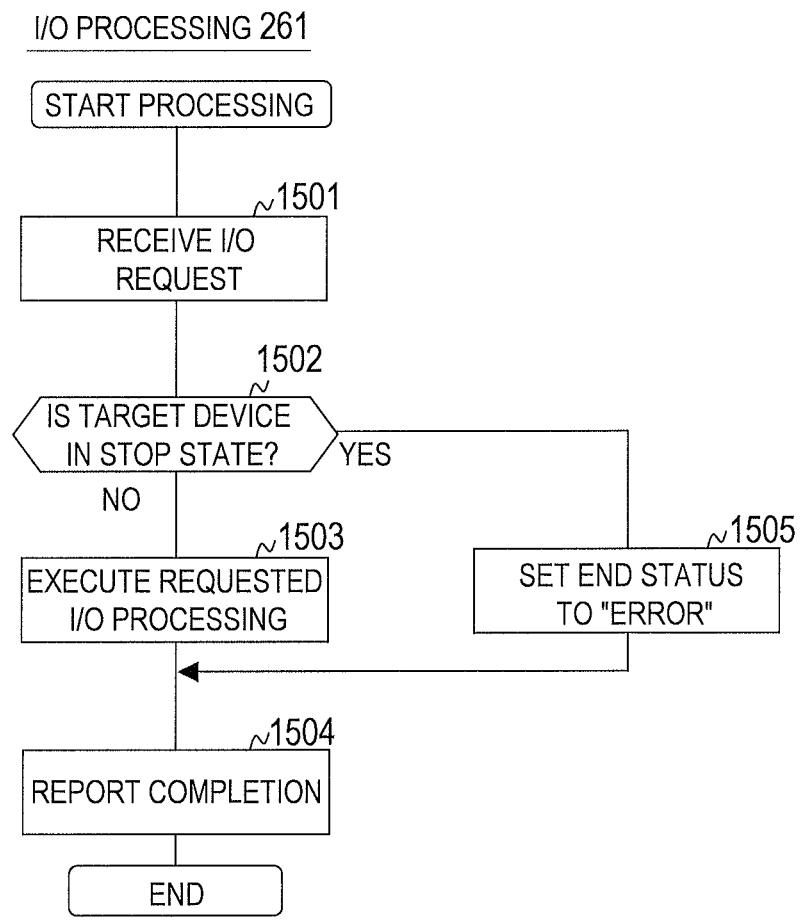
FIG. 15 is a flowchart showing an example of an I/O processing executed on an external storage system according to the embodiment of this invention.

FIG. 15 is a flowchart of an example of the I/O processing 261 executed by the external storage 150 according to the embodiment of this invention.

In the description of FIG. 15, the processing executed by the external storage 150 is actually executed by the control processor 152 executing the I/O processing 261.

In this embodiment, the logical device of the external storage 150 managed as the external device of the storage system 130 stops the corresponding physical device while maintaining the LU path definition of the port 151. At this time, input/output requests from the storage system 130 to the external device should be prevented in principle. However, for safety, the external storage 150 also judges whether the logical device of the I/O processing target is stopped.

Specifically, when receiving an I/O request (step 1501), the external storage 150 judges whether the logical device as the target of the received I/O request is stopped (step 1502).

In step 1502, when it is judged that the logical device is not stopped, the requested I/O processing can be executed. Therefore, the external storage 150 executes the requested I/O processing (step 1503) and transmits the completion report to the storage system 130 (step 1504).

On the other hand, in step 1502, when it is judged that the logical device is stopped, the processing is impossible, and the external storage 150 transmits the error report to the storage system 130. Specifically, the external storage 150 sets the end status as "error" (step 1505) and transmits the completion report to the storage system 130 without executing the requested I/O processing (step 1504). The external storage 150 may report that the device is busy without reporting the error.

Thus, the I/O processing 261 ends.

Figure 16:
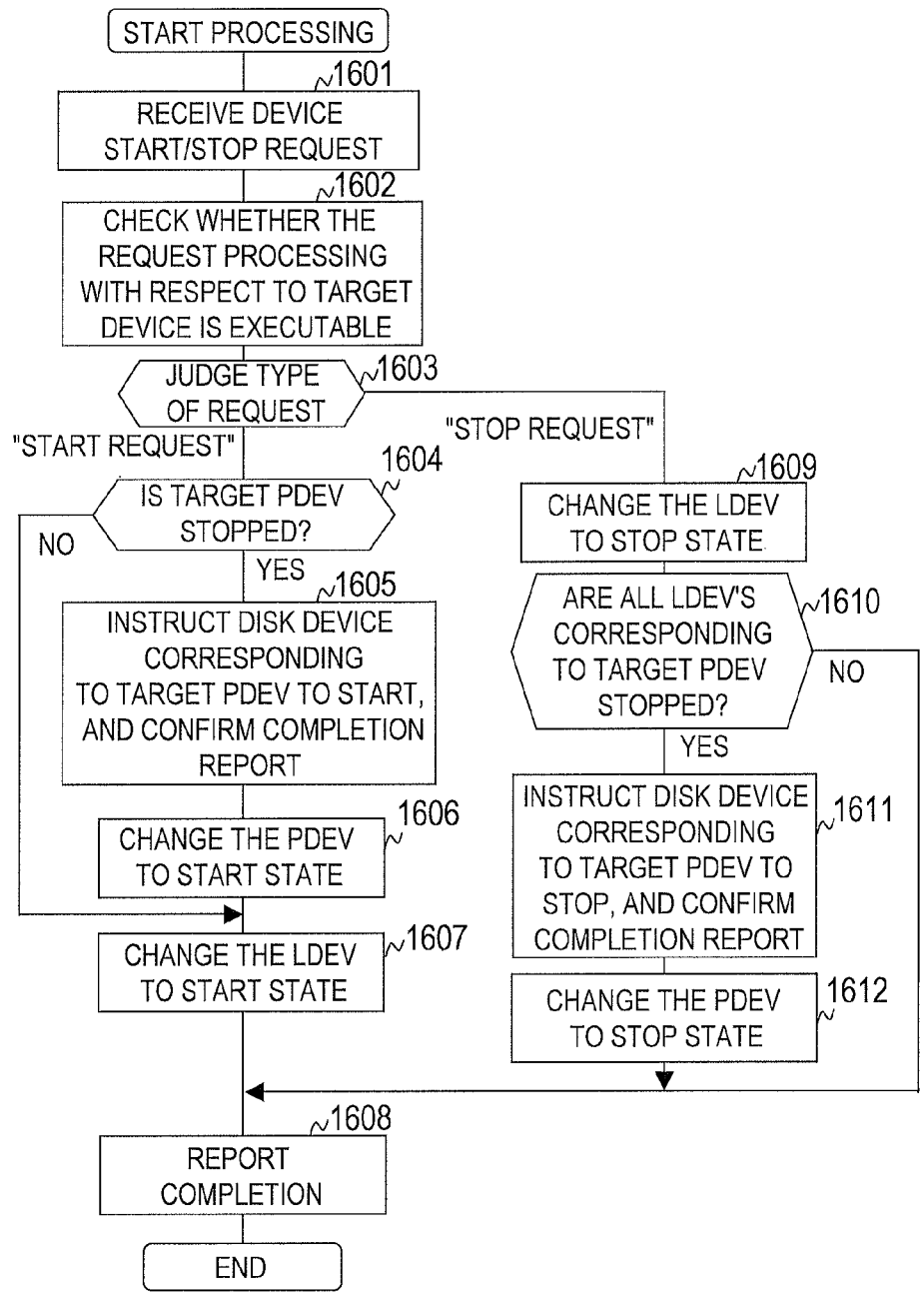
FIG. 16 is a flowchart showing an example of an external device start/stop processing executed on the external storage system according to the embodiment of this invention.

FIG. 16 is a flowchart of an example of the external device start/stop processing 262 executed by the external storage 150 according to the embodiment of this invention.

In the description of FIG. 16, the processing executed by the external storage 150 is actually executed by the control processor 152 executing the external device start/stop processing 262.

The external storage 150 receives a start/stop request command for the logical device corresponding to the external device from the storage system 130 via the Fibre Channel switch 120 and the port 151 (step 1601). The received request includes request content identification information (start or stop), target device specifying information (external storage system 150 identification information and logical device number), and request source storage system 130 identification information (WWN of the port 131, etc). In this embodiment, this request is transmitted according to the SCSI protocol.

This request may be transmitted by extending parameters of the diagnosing command of the SCSI or by adding a dedicated SCSI command working only between the external storage 150 and the storage system 130 and using this SCSI command. Alternatively, a particular logical device in the external storage 150 is defined as a device for control command transmission/reception, and data read and write is performed on the device for control command transmission/reception, whereby data is exchanged between the external storage 150 and the storage system 130.

Next, the external storage 150 judges whether the requested processing can be executed on the logical device of the request target, and when it is judged that the execution is impossible, that effect is reported to the storage system 130 (step 1602).

Next, the external storage 150 judges whether the received request is a start request or a stop request (step 1603).

In step 1603, when it is judged that the received request is the start request for the logical device, the external storage 150 judges whether the physical device corresponding to the logical device of the request target (the logical device) is stopped (step 1604).

In step 1604, when it is judged that the corresponding physical device is stopped, the external storage 150 starts the disk drive 156 corresponding to the physical device (step 1605), and changes the physical device to the start state (step 1606).

Next, the external storage 150 changes the logical device state to the start state (step 1607). Here, start of the disk drive 156 is realized by transmitting a command for instructing disk rotation start and checking the completion report from the disk drive 156 where the disk rotation starts.

On the other hand, in step 1604, when it is judged that the corresponding physical device is not stopped (in other words, in the start state), the external storage 150 executes step 1607 without executing steps 1605 and 1606.

Next, the external storage 150 notifies the storage system 130 of the processing completion (step 1608).

On the other hand, in step 1603, when it is judged that the received request is the stop request for the logical device, the external storage 150 first stops the logical device (step 1609).

Next, the external storage 150 judges whether all logical devices are stopped corresponding to the physical device corresponding to the logical device (step 1610).

In step 1610, when it is judged that all corresponding logical devices are stopped, the disk drive 156 corresponding to the physical device corresponding to the logical device is stopped (step 1611) and changes the physical device to the stopped state (step 1612). Here, stop for the disk drive 156 is realized by transmitting a command for instructing disk rotation stop and checking the completion report from the disk drive 156 where the disk rotation stops.

Next, the external storage 150 executes step 1608.

On the other hand, in step 1610, when it is judged that all corresponding logical devices are not stopped (in other words, at least one logical device is in the start state), the disk drive 156 cannot be stopped. In this case, the external storage 150 executes step 1608 without executing steps 1611 and 1612.

When the external storage 150 executes step 1608, the external device start/stop processing 262 ends.

Figure 17:
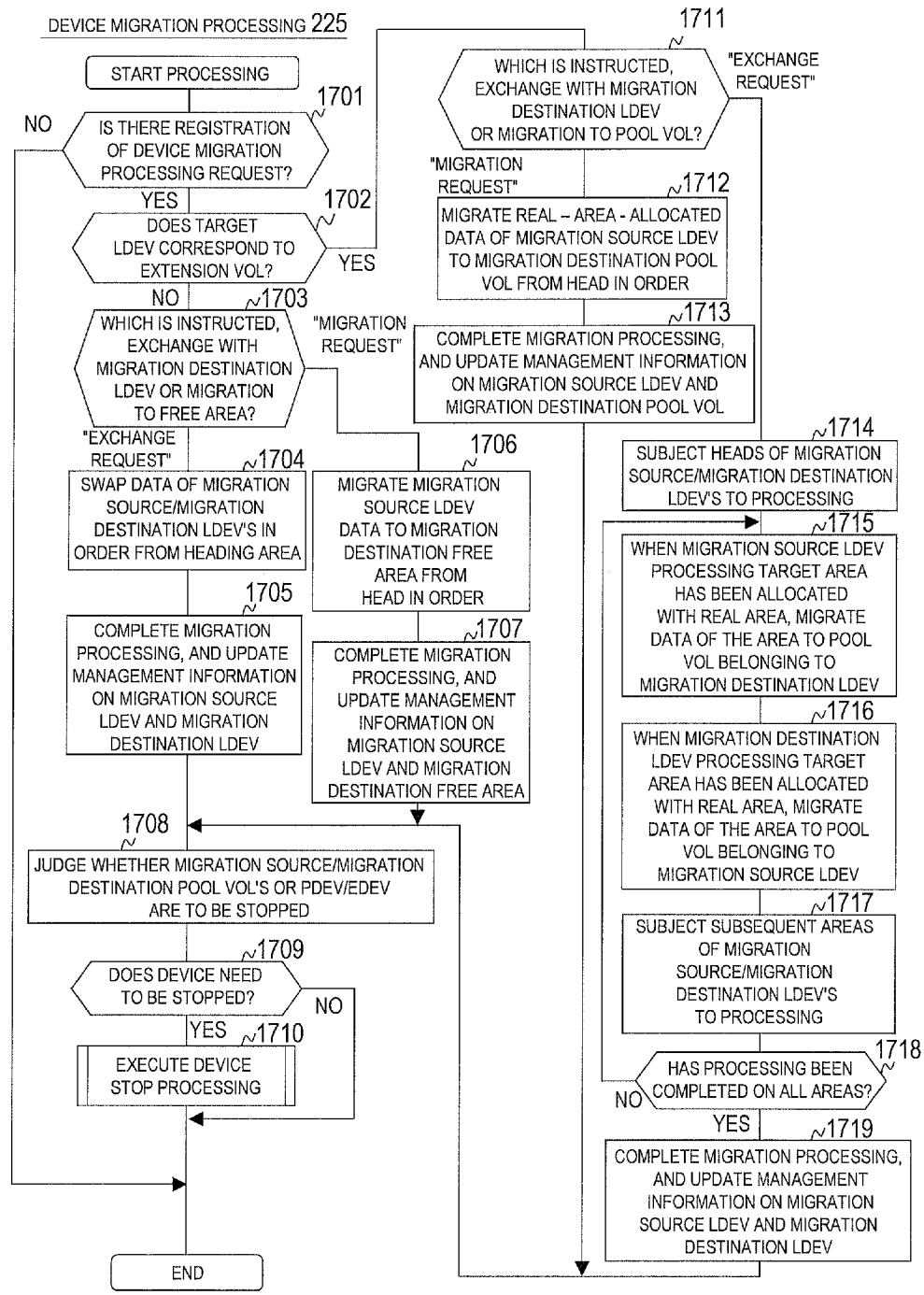
FIG. 17 is a flowchart showing an example of a device migration processing executed on the storage system according to the embodiment of this invention.

FIG. 17 is a flowchart showing an example of a device migration processing 225 executed on the storage system 130 according to the embodiment of this invention.

In the description of FIG. 17, the processing executed by the storage system 130 is actually executed by the control processor 132 for executing the device migration processing 225.

The storage system 130 periodically executes the device migration processing 225 to judge whether or not a device migration request has been registered (step 1701). As described above with reference to step 1214 of FIG. 12 and step 1416 of FIG. 14, the device judgment processing is executed in the device connection switching processing 221 and the stopped device monitoring processing 223 in a case where a physical device, an external device, or a pool VOL corresponding to a logical device in a stop state cannot be stopped. FIG. 18 shows an example of the device judgment processing. As a result, as shown in step 1215 of FIG. 12 and step 1417 of FIG. 14, when a free space to be a migration target or another logical device to be an exchange target is found, the device migration request is registered.

When it is judged in step 1701 that the device migration request has not been registered, the device migration processing 225 ends without executing any processing.

On the other hand, when it is judged in step 1701 that the device migration request has been registered, the storage system 130 judges whether or not the logical device (the logical device) that is a target of the migration request corresponds to an extension VOL (step 1702).

When it is judged in step 1702 that the logical device does not correspond to the extension VOL (in other words, the logical device is a normal volume), the storage system 130 judges whether or not the request is made to migrate the logical device to a free device (step 1703).

When it is judged in step 1703 that the migration to the free device is requested, the storage system 130 migrates data stored in the logical device of the migration source in order from a head address to a migration destination physical device or an external device (step 1706). When data migration is completed on all areas, the storage system 130 updates device management information to associate the logical device of the migration source to the free physical device or the external device of the migration destination (step 1707). To be specific, the number of the physical device, the external device, or the pool VOL of the migration destination is registered in the corresponding downstream device number 303 of the logical device management information 201 relating to the logical device. Further, the logical volume number of the migration destination pool VOL number is registered in the corresponding upstream device number 503 or 603 of the device of the migration destination. In this case, when the free device of the migration destination is in a stop state, the device start/stop processing 222 described above needs to be executed to start the free device of the migration destination.

On the other hand, it is judged in step 1703 that the migration to the free device is not requested (in other words, a request is made to replace the logical device with another logical device), the storage system 130 reads data stored in the logical devices of the migration source and migration destination in order from their head addresses, writes the data to another storage device such as a disk cache in order, and writes the data stored in the logical device of the migration source to the logical device of the migration destination and the data stored in the logical device of the migration destination to the logical device of the migration source (step 1704). When data exchange is completed for all the areas of the logical device, the device management information is updated to change the correspondences with the physical device or the external device between the logical device of the migration source and the logical device of the migration destination (step 1705).

On the other hand, it is judged in step 1702 that the logical device corresponds to the extension VOL, the storage system 130 judges whether or not a request is made to migrate the logical device to another pool VOL (step 1711).

When it is judged in step 1711 that request is made to migrate the logical device to another pool VOL, the storage system 130 searches for entries in which a real area is allocated to the corresponding extension VOL in order from head entry, and adds only data of the entry to a free entry (step 1712). To be specific, the storage system 130 adds the migration destination pool VOL to a pool VOL corresponding to the extension VOL. Then, the data read from the entry of the migration source pool VOL is allocated with a free entry of the migration destination pool VOL, and written to the allocated free entry. Then, the storage system 130 updates the management information to associate the entry of the migration destination VOL with the entry of the extension volume.

At this time, when the pool VOL to be a migration destination is in a stop state, similarly to step 1706, the storage system 130 needs to execute the device start/stop processing 222 to start a device corresponding to the migration destination pool VOL.

The storage system 130 executes the above-mentioned processing sequentially by using the data migration progress pointer 309 of the logical device management information.

When the migration processing is completed for all the area, the storage system 130 deletes the number assigned to the migration source pool VOL (pool VOL that originally corresponds to the logical device) from the corresponding pool number list 707 of the extension VOL (step 1713).

On the other hand, it is judged in step 1711 that the request is made to replace the logical device (migration source) with another logical device (migration destination), the storage system 130 subjects head entries of the migration source and migration destination logical devices to the processing (step 1714).

Next, when a real area (pool VOL entry) is allocated to an entry (area) of a processing target, the storage system 130 newly allocates the entry with a free entry of the pool VOL of an exchange counterpart (migration destination or migration source), and migrates data of the entry of the processing target to the newly allocated free entry (steps 1715 and 1716).

In a case where there is a large difference in the number of entries, which have undergone the migration, between the migration destination and migration source logical devices during this migration processing, it is feared that the number of free entries of the pool VOL of one of the logical devices may become none. Accordingly, the progress needs to be controlled to prevent the number of entries, which have undergone the migration, from differing between the migration destination and migration source logical devices.

Next, the storage system 130 sets the next entry of the current processing target entry as the new processing target in the migration source and migration destination logical device (step 1717).

Next, the storage system 130 judges whether the processing completes for all entries of the migration destination and migration source logical devices (step 1718).

In step 1718, when it is judged that the processing does not complete for all entries, the processing returns to step 1715 for processing performing for the next entry.

On the other hand, in step 1718, when it is judged that the processing completes for all entries, exchange completes for all entries in the migration source and migration destination logical device. In this case, the storage system 130 updates the device management information so that correspondence between the migration destination and migration source logical devices and the respective pool VOLs (step 1719).

When processing of step 1705, 1707, 1713, or 1719 completes, processing of migrating the stopped logical device to another physical device, external device, or pool VOL completes. Next, the storage system 130 judges again whether for the migration destination and migration source logical devices, the physical device, external device, or pool VOL corresponding to the migration destination and migration source logical devices needs to be stopped (steps 1718 and 1719). At this time, similar to step 1209 of FIG. 12, the storage system 130 judges whether all extension VOLs corresponding to the pool VOL are stopped.

In step 1709, when it is judged that the physical device, external device, or pool VOL needs to be stopped, the storage system 130 executes the device start/stop processing 262 to stop the corresponding physical device, etc. (step 1710), thereby completing the processing.

On the other hand, in step 1709, when it is judged that the physical device, external device, or pool VOL needs not to be stopped, the storage system 130 finishes the processing without executing the device start/stop processing 262.

It should be noted that this invention is not limited to the above-mentioned embodiment, and various modifications may be made.

According to this embodiment, the storage system 130 includes the external storage system connection means. To be specific, the storage system 130 includes the information (for example, external device management information 204) for managing an external storage system. Further, the program stored in the storage system 130 takes into consideration the presence of the external storage system. However, the storage system 130 may not necessarily include the external storage system connection means. In other words, the management server 110 and the storage system 130 may subject only the disk drive 137 included therein to device pool management in consideration of whether the start/stop control can be made. Alternatively, the storage system 130 may not necessarily include the disk drive 137 therein, and the management server 110 and the storage system 130 may perform the device pool management only on the external device connected through the external storage system connection means.

According to this embodiment, upon reception of a detach request with respect to a logical device from a storage administrator or a host application, the management server 110 judges whether or not the logical device needs to be stopped, and if necessary, the storage system 130 stops the logical device. However, the management server 110 may receive a start or stop request with respect to the logical device which does not include a detach or attach request. Thus, while maintaining the access path from the host to the logical device, the disk drive 137 etc. corresponding to the logical device may be subjected to the start and stop control.

Further, according to this embodiment, the LU path definitions of all the ports 131 are released with respect to the detach target logical device. However, the LU path definitions of all the ports 131 may be released with respect to only a particular port 131 specified by a user or an application program.

Further, according to this embodiment, the request processing for device connection switching processing 241 of the management server 110 judges whether or not the device needs to be stopped. However, the device connection switching processing 221 of the storage system 130 may judge whether or not the device needs to be stopped.

Further, according to this embodiment, upon attachment of a logical device, the port 131 and an LUN are specified. However, another logical device may be detached, and the port 131 and the LUN may be used to attach the logical device. This presupposes the use of a protocol for checking the corresponding logical device always before starting access from the host 100 to the LUN. Further, "automatic-detachable" is set as an attribute of the logical device. To attach the first logical device, after another "automatic-detachable" second logical device is detached, the LUN of port 131 associated with the second logical device is used to attach the first logical device. Similarly, the external device may be set with an "automatic-detachable" attribute, and to attach the first external device, after the second external device is detached, the logical device associated with the second external device may be used to attach the first external device.

Further, according to this embodiment, a command is transmitted to the disk drive 137 corresponding to the physical device of the storage system 130 or to the disk drive 157 corresponding to the physical device of the external storage system 150, and the controller within the disk drive 137 or 157 controls disk rotation to control start and stop of the disk drive 137 or 157. However, the storage system 130 or the external storage system 150 may include a switch that allows turning on/off of power supply to the disk drive 137 or 157, and the switches may be used to control the start and stop of the disk drive 137 or 157.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising:
a first storage apparatus including a first processor configured to provide at least a first virtual volume and a second virtual volume to a computer,
a second storage apparatus coupled to the first storage apparatus and including a second processor configured to be capable of controlling start and stop of rotation of a plurality of first disk drives and to provide a first logical volume being configured with the plurality of first disk drives to the first storage apparatus, and
a third storage apparatus coupled to the first storage apparatus and including a third processor configured to be incapable of controlling start and stop of rotation of a plurality of second disk drives and to provide a second logical volume being configured with the plurality of second disk drives to the first storage apparatus,
wherein the first processor is configured to make the first logical volume in the second storage apparatus correspond to the first virtual volume and to make the second logical volume in the third storage apparatus correspond to the second virtual volume depending on attributes or a purpose of the first and second virtual volumes,
wherein the first processor is configured to allocate a first storage region in the first logical volume to the first virtual volume or a second storage region in the second logical volume to the second virtual volume in response to receiving a write request to the first virtual volume or the second virtual volume from the computer for storing data corresponding to the write request,
wherein the first processor is configured to stop the second virtual volume in response to receiving an external request to stop the second virtual volume and to migrate data in a plurality of second storage regions held as data in the second virtual volume to one or more first storage regions which are in a plurality of first storage regions in the first logical volume and have not been allocated to the first virtual volume,
wherein the first processor determines whether the first virtual volume corresponding to the first logical volume has been stopped and, in a case of a determination that the first virtual volume has been stopped, instructs the second storage apparatus to stop the first logical volume, and
wherein the second processor stops the first logical volume and stops rotation of the plurality of first disk drives composing the first logical volume in response to receiving the instruction from the first storage apparatus.

2. A computer system according to claim 1, wherein the second storage apparatus includes a first pool volume including the first logical volume, and the third storage apparatus includes a second pool volume including the second logical volume.

3. A computer system according to claim 1,
wherein the first processor stops the first virtual volume and instructs the second storage apparatus to stop the first logical volume in response to receiving the external request to stop the first virtual volume, and
wherein the second processor stops the first logical volume and stops rotation of the plurality of first disk drives composing the first logical volume in response to receiving the instruction from the first storage apparatus.

4. A computer system according to claim 1,
wherein, in a case where a plurality of virtual volumes have been made to correspond to the first logical volume, the first processor determines whether all of the virtual volumes corresponding to the first logical volume have been stopped and, in a case of a determination that all of the virtual volumes have been stopped, instructs the second storage apparatus to stop the first logical volume.

5. A computer system according to claim 1,
wherein, in a case where at least one other logical volume has been made to correspond to the plurality of first disk drives composing the first logical volume, the second processor determines whether all of the logical volumes corresponding to the plurality of first disk drives have been stopped and, in a case of a determination that all of the logical volumes have been stopped, stops rotation of the plurality of first disk drives.

6. A computer system comprising:
a first storage apparatus including a first processor configured to provide a plurality of virtual volumes to a computer,
a second storage apparatus coupled to the first storage apparatus and including a second processor configured to be capable of controlling start and stop of rotation of a plurality of first disk drives and to provide a first logical volume being configured with the plurality of first disk drives to the first storage apparatus, and
a third storage apparatus coupled to the first storage apparatus and including a third processor configured to be incapable of controlling start and stop of rotation of a plurality of second disk drives and to provide a second logical volume being configured with the plurality of second disk drives to the first storage apparatus,
wherein the first processor is configured to make the first logical volume in the second storage apparatus or the second logical volume in the third storage apparatus correspond to each of the virtual volumes depending on attributes or a purpose of the virtual volumes,
wherein the first processor is configured to allocate a first storage region in one of the first logical volume or a second storage region in one of the second logical volume to one of the virtual volumes in response to receiving a write request to the one of the virtual volumes from the computer for storing data corresponding to the write request in the one of the virtual volumes,
wherein the first processor is configured to stop a specific virtual volume in response to receiving an external request to stop the specific virtual volume and to determine whether the specific virtual volume has been made to correspond to the first logical volume,
wherein, in a case where that the specific virtual volume has been made correspond to the second logical volume, the first processor is configured to migrate data in second storage regions held as data in the specific virtual volume to one or more first storage regions which are in a plurality of first storage regions in the first logical volume and have not been allocated to any of the virtual volumes,
wherein the first processor determines whether at least one other virtual volume corresponding to the first logical volume has been stopped and, in a case of determination that the at least one other virtual volume has been stopped, instructs the second storage apparatus to stop the first logical volume, and
wherein the second processor stops the first logical volume and stops rotation of the plurality of first disk drives composing the first logical volume in response to receiving the instruction from the first storage apparatus.

7. A control method for a computer system including:

a first storage apparatus configured to provide at least a first virtual volume and a second virtual volume to a computer;

a second storage apparatus coupled to the first storage apparatus and configured to be capable of controlling start and stop of rotation of a plurality of first disk drives and to provide a first logical volume being configured with the plurality of first disk drives to the first storage apparatus; and a third storage apparatus coupled to the first storage apparatus and configured to be incapable of controlling start and stop of rotation of a plurality of second disk drives and to provide a second logical volume being configured with the plurality of second disk drives to the first storage apparatus, the method comprising steps of:

making the first logical volume in the second storage apparatus correspond to the first virtual volume and the second logical volume in the third storage apparatus correspond to the second virtual volume depending on attributes or purposes of the first and second virtual volumes;

allocating one of first storage regions in the first logical volume to the first virtual volume or one of second storage regions in the second logical volume to the second virtual volume in response to receiving a write request to the first virtual volume or the second virtual volume from the computer for storing a data corresponding to the write request;

stopping the second virtual volume in response to receiving a request to stop the second virtual volume;

migrating data in the second storage regions held as data in the second virtual volume to one or more first storage regions which are in the first storage regions in the first logical volume and have not been allocated to the first virtual volume;

determining whether the first virtual volume corresponding to the first logical volume has been stopped;

stopping the first logical volume in a case of a determination that the first virtual volume has been stopped; and stopping rotation of the plurality of first disk drives composing the first logical volume.

8. A control method according to claim 7, further comprising steps of:

stopping the first virtual volume in response to receiving a request to stop the first virtual volume;

stopping the first logical volume; and stopping rotation of the plurality of first disk drives composing the first logical volume.

9. A control method according to claim 7, wherein, in a case where a plurality of virtual volumes have been made to correspond to the first logical volume, the control method comprises steps of:

determining whether all of the virtual volumes corresponding to the first logical volume have been stopped; and, stopping the first logical volume in a case of a determination that all of the virtual volumes have been stopped.

10. A control method according to claim 7, wherein, in a case where at least one other logical volume have been made correspond to the plurality of first disk drives composing the first logical volume, the control method comprises steps of:

determining whether all of the logical volumes corresponding to the plurality of first disk drives have been stopped; and stopping rotation of the plurality of first disk drives in a case of a determination that all of the logical volumes have been stopped.

* * * * *